United States Patent
Baek et al.

(10) Patent No.: US 8,515,461 B2
(45) Date of Patent: Aug. 20, 2013

(54) MOBILE TERMINAL AND CONTROLLING METHOD THEREOF

(75) Inventors: Sung Min Baek, Anyang-si (KR); Dong Hyun Lee, Incheon-si (KR); Sun Yuoung Hwang, Seoul (KR); Hyun Namgung, Guri-si (KR); Jin Young Kim, Gyeonggi-do (KR); Jin Won Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 220 days.

(21) Appl. No.: 13/012,424

(22) Filed: Jan. 24, 2011

(65) Prior Publication Data

US 2011/0183719 A1    Jul. 28, 2011

(30) Foreign Application Priority Data

Jan. 25, 2010 (KR) ........................ 10-2010-0006433

(51) Int. Cl.
*H04W 24/00* (2009.01)

(52) U.S. Cl.
USPC ..... 455/457; 455/456.1; 455/518; 455/556.1; 455/557; 455/566

(58) Field of Classification Search
USPC ........ 455/412.1–414.1, 556.1–559, 566–567; 348/142–143, 211.1–211.4
See application file for complete search history.

(56) References Cited

U.S. PATENT DOCUMENTS

| | | | |
|---|---|---|---|
| 6,434,405 B1 * | 8/2002 | Sashihara | 455/557 |
| 2003/0090502 A1 * | 5/2003 | Yuasa et al. | 345/700 |
| 2006/0007318 A1 * | 1/2006 | Kanayama et al. | 348/211.3 |
| 2007/0239981 A1 * | 10/2007 | Lessing | 713/164 |
| 2007/0271528 A1 | 11/2007 | Park et al. | |
| 2008/0301180 A1 | 12/2008 | Klassen et al. | |
| 2009/0117936 A1 * | 5/2009 | Maeng | 455/550.1 |
| 2009/0320070 A1 * | 12/2009 | Inoguchi | 725/40 |
| 2010/0177156 A1 * | 7/2010 | Kim et al. | 348/14.02 |
| 2011/0185437 A1 * | 7/2011 | Tran et al. | 726/28 |
| 2013/0022038 A1 * | 1/2013 | Cadiz et al. | 370/352 |

FOREIGN PATENT DOCUMENTS

| | | | |
|---|---|---|---|
| CN | 1494346 A | 5/2004 | |
| CN | 1780443 A | 5/2006 | |
| CN | 1798392 A | 7/2006 | |
| CN | 101102569 A | 1/2008 | |
| EP | 1 677 494 A1 | 7/2006 | |
| EP | 2 056 215 A1 | 5/2009 | |

* cited by examiner

*Primary Examiner* — Dai A Phuong
(74) *Attorney, Agent, or Firm* — Birch, Stewart, Kolasch & Birch, LLP

(57) ABSTRACT

A mobile terminal includes a display unit configured to display content on a screen, a wireless communication unit configured to communicate with at least one external terminal, and a control unit configured to display a menu list including a transmission menu of the content when a command for displaying the menu list related to the content is input, and control the communication unit to transmit the content to the external terminal when the transmission menu is selected.

20 Claims, 28 Drawing Sheets

FIG. 6

FIG. 23
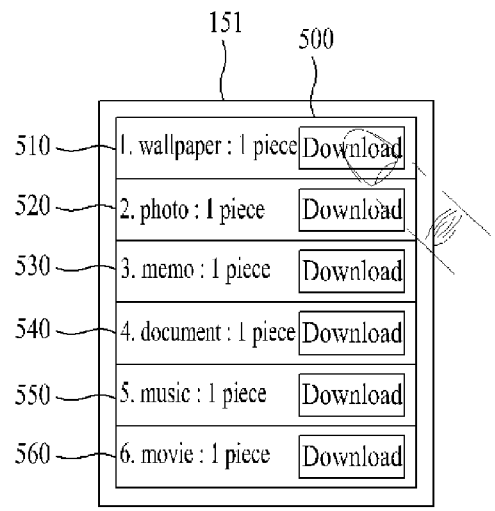
(a)
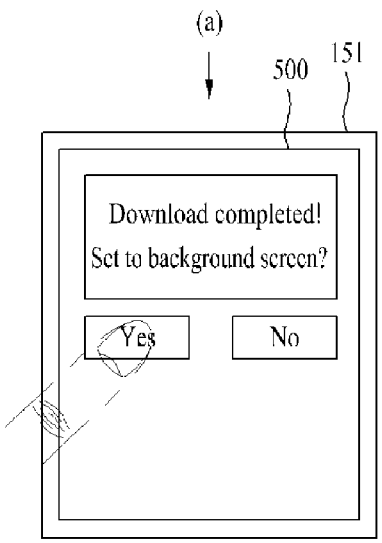
(b)
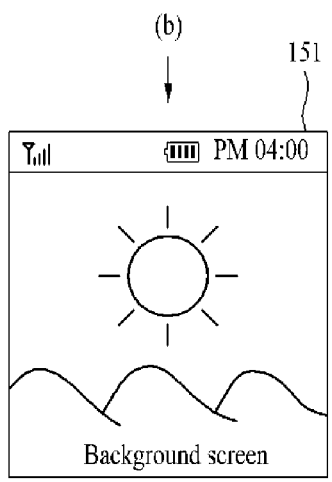
(c)

MOBILE TERMINAL AND CONTROLLING METHOD THEREOF

Pursuant to 35 U.S.C. §119(a), this application claims the benefit of earlier filing date and right of priority to Korean Application No. 10-2010-0006433, filed on Jan. 25, 2010, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

And, the above-configured mobile terminal connects a communication with such an external device having a display unit and an input unit as a notebook computer, a personal computer, a PDA and the like using wire/wireless communication and is able to transceive data with the external device.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof. In particular, when a menu list related to a specific content is displayed on a screen of a first terminal, a transmission menu for transmitting the content to a second terminal is displayed by being added to the menu list. If the transmission menu is selected, the content is transmitted to the second terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a display unit configured to display at least one content on a screen, a communication unit configured to communicate with at least one external terminal, and a control unit configured to display a menu list including a transmit menu of the content when a command for displaying the menu list related to the content is inputted, to control the communication unit to transmit the content to the external terminal when the transmit menu is selected.

In another aspect of the present invention, a method of controlling a mobile terminal according to the present invention includes the steps of displaying at least one content on a screen, displaying a menu list including a transmit menu of the content when a command for displaying the menu list related to the content is inputted, and transmitting the content to at least one external terminal when the transmit menu is selected.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

Figure 6:
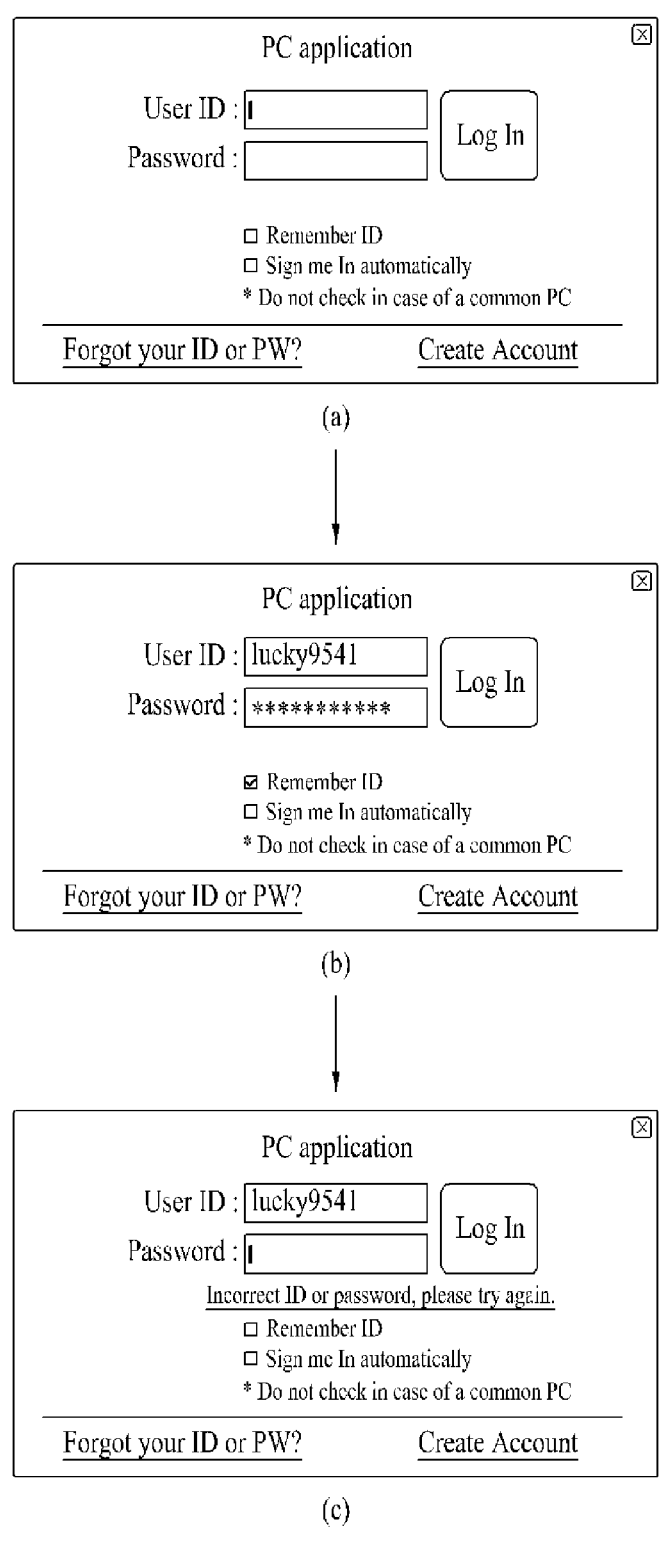

FIGS. 6 to 9 are diagrams of screen configurations for a driven state of an application for enabling a PC to access a server and transmit content data to the server;

FIG. 23 is a diagram of screen configurations for a mobile terminal to download wallpaper content data in a content data list received from a server;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

The following detailed description is made on the assumption that first and second terminals include a PC and a mobile terminal, respectively, by which the present invention is non-limited. Alternatively, each of the first and second terminals includes a mobile terminal. Alternatively, the first terminal includes a mobile terminal and the second terminal includes a PC.

In the following description, a second terminal according to the present invention is explained in detail with reference to FIG. 1.

Figure 1:
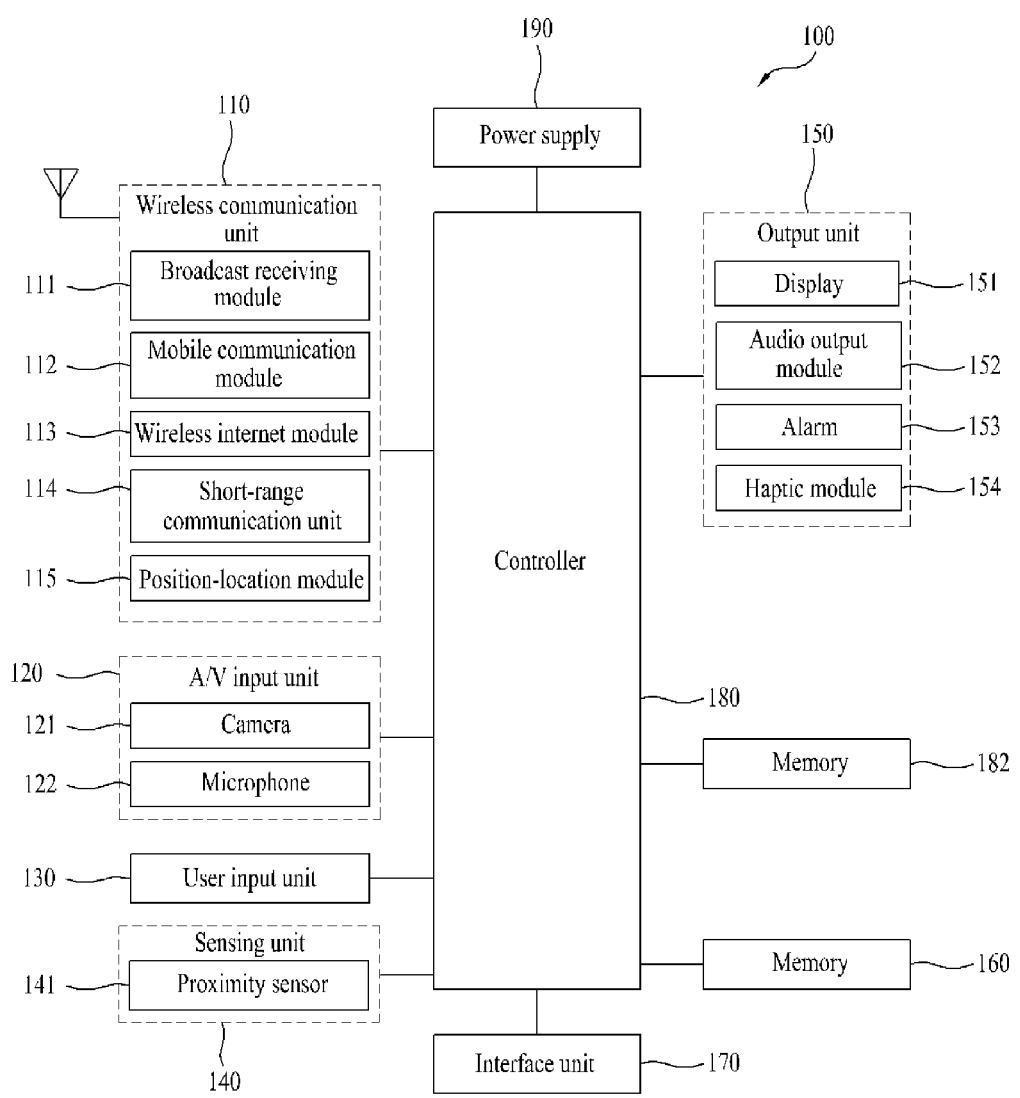
FIG. 1 is a block diagram of a second terminal of a mobile terminal type according to one embodiment of the present invention.

FIG. 1 is a block diagram of a second terminal of a mobile terminal type according to one embodiment of the present invention.

FIG. 1 shows the second terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

The wireless communication unit 110 performs a communication between the mobile terminal 100 and a wireless communication system, a communication between the mobile terminal 100 and a network having the mobile terminal 100 located therein, and/or a communication with a server 300 having a content data of the PC 200 stored therein according to the present invention. And, the wireless communication unit 10 is able to include at least one module configured to download the content data of the PC 200 from the server 300.

For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

Moreover, when a communication between the mobile communication module 112 and the server 300 having the content data of the PC 200 stored therein according to the present invention is connected, if a user's access to the server 300 is granted, the mobile communication module 112 receives the content data of the PC 200 stored in the server 300.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

Moreover, when a communication between the wireless internet module 113 and the server 300 having the content data of the PC 200 stored therein according to the present invention is connected, if a user's access to the server 300 is granted, the wireless internet module 113 receives the content data of the PC 200 stored in the server 300.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Moreover, when a communication between the short range communication module 114 and the server 300 having the content data of the PC 200 stored therein according to the present invention is connected, if a user's access to the server 300 is granted, the short range communication module 114 receives the content data of the PC 200 stored in the server 300.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122.

The camera 121 possesses a digital zoom and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

Moreover, the memory 160 is provided with an application for enabling the mobile terminal 100 to access the server 300 and download the content data of the PC 200 stored in the server 300.

Once the application is driven, an initial user login screen of the mobile terminal 100 is outputted. If a user authentication for the login is successful, the controller 180 uploads device information of the mobile terminal 100 and user information of the mobile terminal to the server 300 via the wireless communication unit 110.

Moreover, after the user authentication has been successfully completed, if the sever 300 is accessed, the controller 180 controls the wireless communication unit 110 to receive the content data of the PC 200 from the server or download the content data of the PC 200 stored in the server 300.

Details of the application shall be described in detail later in this disclosure.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

Moreover, the interface unit 170 can be wire-connected to the PC 200 using a data cable and the like instead of passing through the server 300 and is then able to directly receive the content data of the PC 200.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

So far, in the above description, the configuration of the mobile terminal 100 according to the present invention is explained.

In the following description, a first terminal 200 according to the present invention is explained in detail with reference to FIG. 2.

Figure 2:
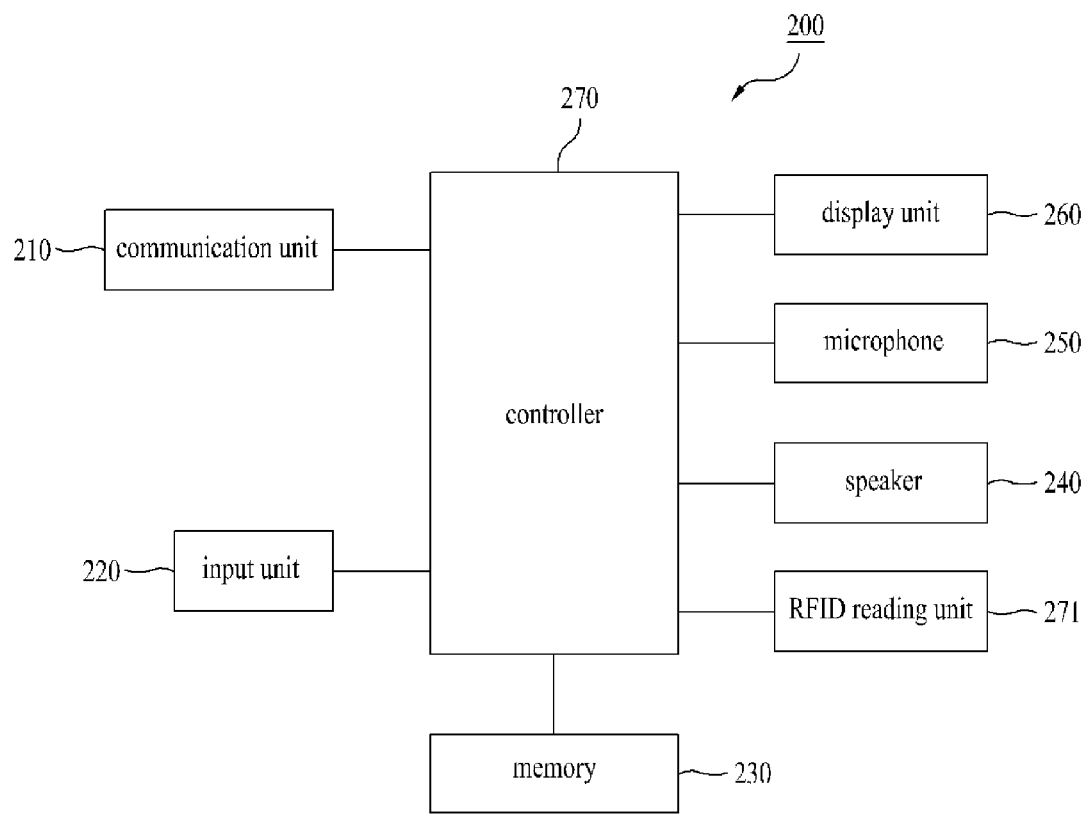
FIG. 2 is a block diagram of a first terminal of a personal computer (PC) type according to one embodiment of the present invention.

FIG. 2 shows that a first terminal according to the present invention is a personal computer (PC). Alternatively, as mentioned in the foregoing description, the first terminal 200 can include any kinds of devices capable of a communication with the mobile terminal 100, a screen display and an audio output.

FIG. 2 is a block diagram of a first terminal of a personal computer (PC) type according to one embodiment of the present invention.

Referring to FIG. 2, a PC 200 according to the present invention includes a communication unit 210, an input unit 220, a memory 230, a speaker 240, a microphone 250, a display unit 260 and a control unit 270.

In addition to the above components, the PC 200 can further include the components (e.g., camera, interface unit, etc.) mentioned in the description of the PC 200.

Under the control of the control unit 270, the communication unit 210 connects a communication with the server 300 and then transmits content data of the PC 200 to the server 300.

The above-configured communication unit 210 can include a mobile communication module, a wireless internet module and a short range communication module like the former communication unit 110 of the mobile terminal 100 shown in FIG. 1.

The input unit 220 generates a key signal for controlling an operation of the PC 200. The input unit 220 is able to include a keypad, a dome switch, a touchpad (static pressure/electrostatic), a jog wheel, a jog switch, a mouse and/or the like if necessary.

In the following description, assume that the input unit 200 includes the mouse, by which a type of the input unit 220 according to the present invention is non-limited.

The mouse 200 is able to shift a position of a pointer (hereinafter named a cursor or a highlight) displayed on a screen of the display unit 260. And, the mouse 220 includes a left key for selecting and executing a content existing on the screen and/or designating a specific region on the screen by a drag and a right key for displaying a menu list related to the content on the screen of the display unit 260.

The memory 230 is configured to store a program for the operation of the PC 200 and various kinds of user content data.

In this case, the content data can include such data storable in the PC 200 as a text, an image, a video file, a music file, a photo file, a game file, a document file, a webpage address list and the like.

And, the memory 230 is provided with an application for enabling the PC 200 to access the server 300 and transmit the content data of the PC 200 to the server 300.

In particular, once the application is driven, an initial login screen of a user of the PC 200 100 is outputted. If a user authentication for the login is successful, the control unit 270 accesses the server 300 via the communication unit 210.

After the server 300 has been accessed, the control unit 270 receives s device information of the mobile terminal 100 previously registered with the server 300 and user information of the mobile terminal 100 from the server 300.

While the server 300 is accessed, if the right key of the mouse 220 is inputted to a specific content on the screen of the display unit 260, the control unit 270 displays a menu list related to the content around the content and also displays a transmit menu for transmitting the content to the mobile terminal 100 via the server 300 within the menu list in addition. If the transmit menu is selected, the control unit 270 transmits the content to the server 300 via the communication unit 210.

Details of the application shall be explained in detail later in this disclosure.

The speaker 240 outputs data containing sound stored in the memory 230 and various sounds generated from the PC 200. And, the microphone 250 receives an external sound signal and then converts the inputted signal to an electrical audio data.

And, the display unit 260 displays the information processed by the PC 200.

The above-configured display unit 260 can include at least one of a liquid crystal display (LCD), a thin film transistor liquid crystal display (TFT LCD), an organic light emitting diode (OLED), a flexible display, a 3D display and the like. Moreover, the display unit 260 is combined with a touch sensor to configure a touchscreen. Alternatively, the display unit 260 can include a monitor.

The control unit 270 controls overall operations of the PC 200. According to the present invention, while the pointer is located at the specific content on the screen of the display unit 260, if the right key of the mouse 220 is inputted, the control unit 270 controls the menu list including the transmit menu of the content to be displayed around the content. Afterwards, if the transmit menu is selected, the control unit 270 controls the content to be transmitted to the external terminal 100 via the server 300 using the communication unit 210.

So far, in the above description, the configuration of the PC 200 according to the present invention is explained.

In the following description, the sever 300 according to the present invention is explained in detail with reference to FIG. 3.

Figure 3:
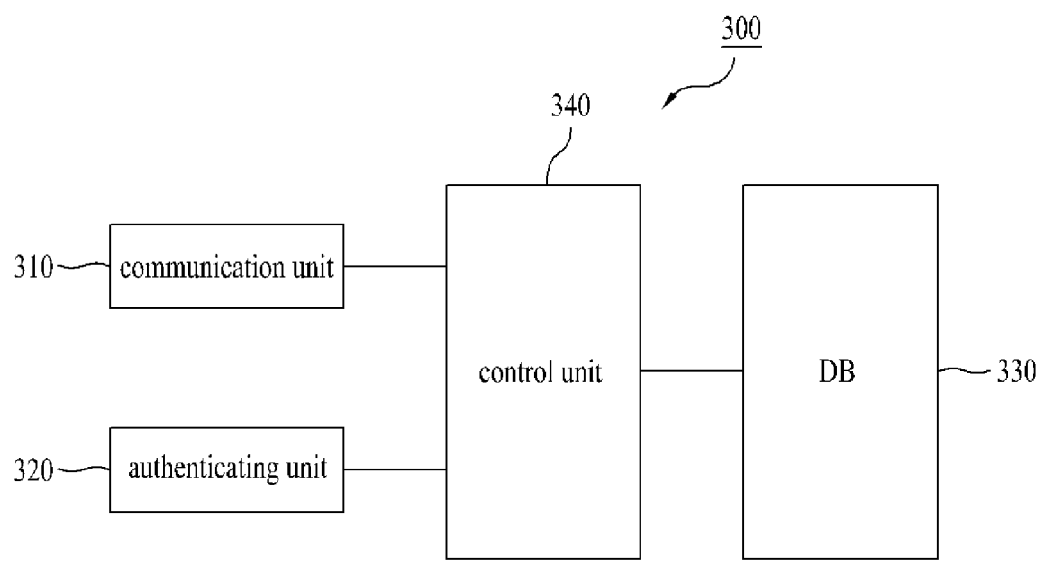
FIG. 3 is a block diagram of a server according to one embodiment of the present invention.

FIG. 3 is a block diagram of a server according to one embodiment of the present invention.

Referring to FIG. 3, a server 300 according to the present invention includes a communication unit 310, an authenticating unit 320, a database (hereinafter abbreviated DB) 330 and a control unit 340.

The communication unit 310 connects a communication with the PC 200 and the mobile terminal 100 under the control of the control unit 340, receives content data from the PC 200, and then transmits the content data received from the PC 200 to the mobile terminal 100.

The above-configured communication unit 310 can include a mobile communication module, a wireless internet module and a short range communication module like the former communication unit 110 of the mobile terminal 100 shown in FIG. 1.

The authenticating unit 320 is provided with the user information of the PC 200 and the user information of the mobile terminal 100. If the login information for the access to the server 300, which is received from the PC 200, matches the provided user information, the authenticating unit 320 grants the access of the PC 200. If the login information for the access to the server 300, which is received from the PC 200, does not match the provided user information, the authenticating unit 320 cuts off the access of the PC 200.

If the login information for the access to the server 300, which is received from the mobile terminal 100, matches the provided user information, the authenticating unit 320 grants the access of the mobile terminal 100. If the login information for the access to the server 300, which is received from the mobile terminal 100, does not match the provided user information, the authenticating unit 320 cuts off the access of the mobile terminal 100.

The user information of the accessible PC 200 and the user information of the accessible mobile terminal 100 are stored in the DB 330. And, the content data received from the PC 200 is stored in the DB 330 as well.

The control unit 340 controls overall operations of the server 300. If the access of the PC 200 is granted via the authenticating unit 320, the control unit 340 controls the content data received from the PC 200 to be stored in the DB 330.

If the access of the mobile terminal 100 is granted via the authenticating unit 320, the control unit 340 controls the communication unit 310 to transmit the content data of the PC 200 to the mobile terminal 100 or grants the mobile terminal 100 to download the content data of the PC 200.

Figure 4:
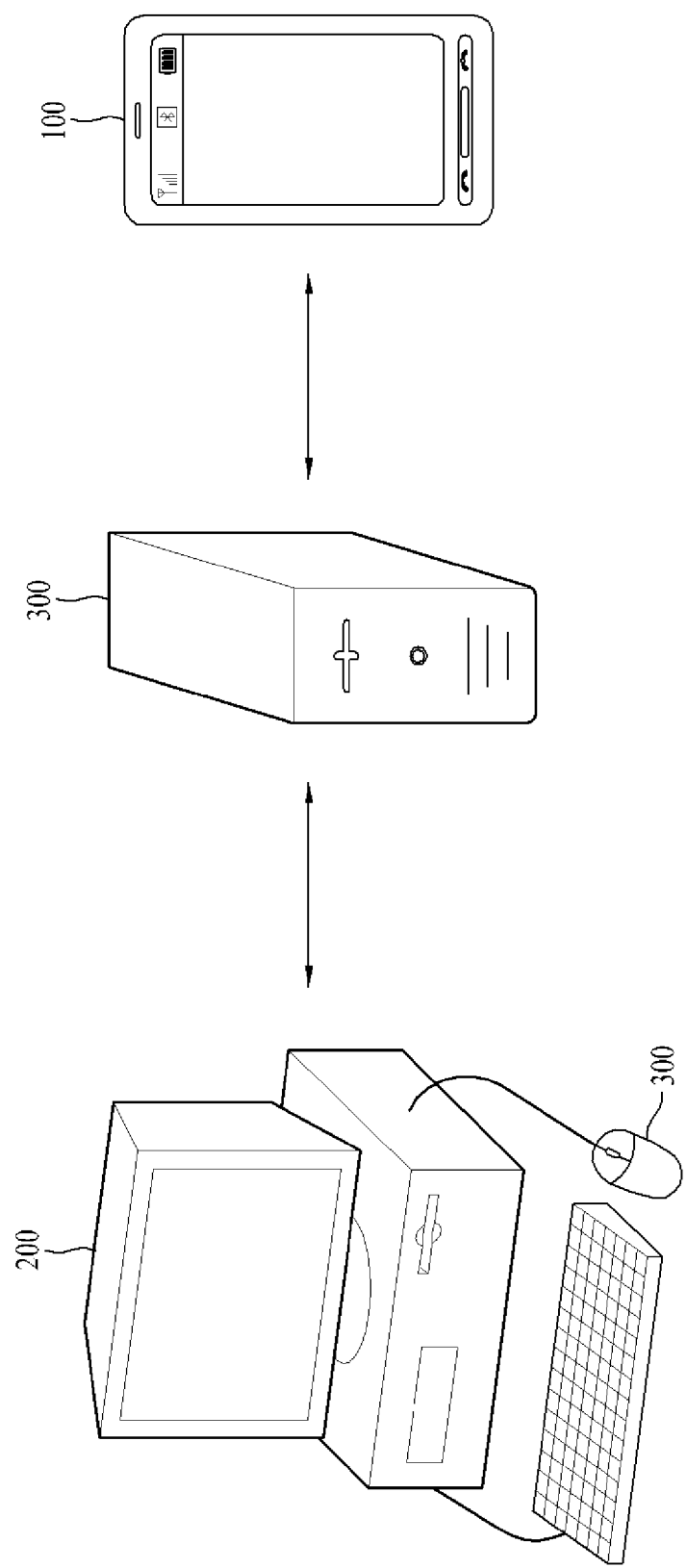
FIG. 4 is a diagram of a data transceiving system according to the present invention.

FIG. 4 is a diagram of a data transceiving system according to the present invention.

Referring to FIG. 4, a transceiving system according to the present invention includes a PC 200, a mobile terminal 100 and a server 300.

If the aforesaid application for the access and content data transmission of the server 300 is executed, the PC 200 accesses the server 300 by the login process via the application.

If the server 300 accesses the PC 200, it transmits the device information of the mobile terminal, which is linked to the PC 200, to the PC 200.

While the PC 200 accesses the server 300, if the right key of the mouse 220 is inputted to a content on the screen, the PC 200 displays a menu list related to the content, which is the right key functionality of the mouse 220 and also displays a transmit menu for transmitting the content to the mobile terminal 100 via the server 300 within the menu list in addition.

If the transmit menu is selected by a user, the PC 200 transmits the content data to the server 300. The server 300 then enables the content data received from the PC 200 to be stored in the DB 330.

Once the aforesaid application for the access and content data transmission of the server 300 is executed, the mobile terminal 100 accesses the server 300 by the login process using the application.

Once the mobile terminal 100 accesses the server 300, the mobile terminal 100 receives a list of the content data, which has been received from the PC 200, from the server 300. If a specific content data is selected from the received content data list, the mobile terminal 100 makes a request for the selected content data to the server 300 and then receives the requested content data. Alternatively, the mobile terminal 100 directly downloads the selected data from the server 300.

In the following description, an accessing process between the PC 200 and the server 300 and a corresponding content data transfer process are explained in detail with reference to FIGS. 5 to 9.

Figure 5:
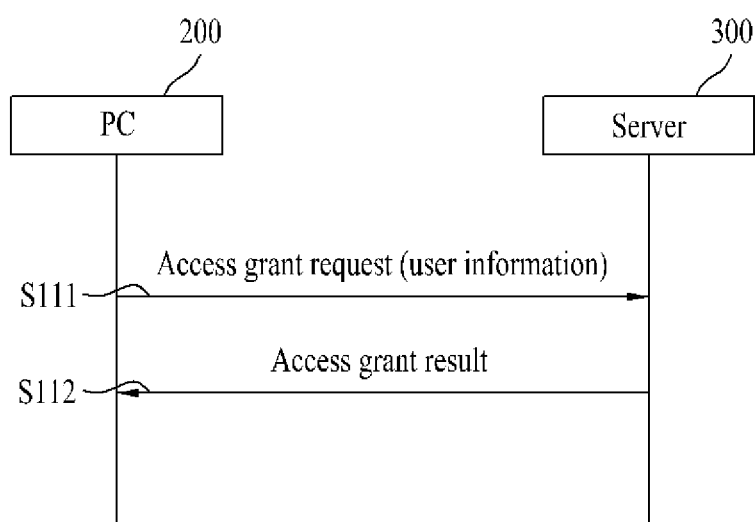
FIG. 5 is a signal processing diagram of a process between a PC and a server according to the present invention.

FIG. 5 is a signal processing diagram of a process between a PC and a server according to the present invention.

Referring to FIG. 5, the control unit 270 of the PC 200 drives an application for an access to the server 300 and a corresponding content data transfer. If a user ID and password, which is the information on a user, and device information of the PC 200 are inputted via a login screen of the application, the control unit 270 of the PC 200 transmits the inputted user information to the server 300 via the communication unit 210 [S111].

Table 1 shows one example of an access grant request signal format containing user information transmitted to the server 300 by the PC 200.

TABLE 1

| Parameter | value | value example | description |
|---|---|---|---|
| Input data | | | |
| User ID | USER_ID | lucky9541 | User ID registered with server |
| Password | USER_PW | DF493SALD021 | User password registered with server |
| Device information | DEVICE_ID | 00-FF-E0-11-22-33 | Device information of PC |
| Request Format | | | |
| HTTPS Body | | USER_ID = lucky9541&USR_PW = DF493SALD021&DEVICE_ID = 00-FF-E0-11-22-33 | |

Referring to Table 1, the control unit 270 of the PC 200 shows the following example. First of all, the user ID inputted via the login screen of the application is 'lucky9541'. The password is 'DF493SALD021'. And, the device information of the PC 200 is '00-FF-E0-11-22-33'.

The control unit 270 of the PC 200 generates an access grant request signal having a format of 'USER_ID=lucky9541 & USR_PW=DF493SALD021 & DEVICE_ID=00-FF-E0-11-22-33' from the inputted lucky9541, DF493SALD021 and 00-FF-E0-11-22-33. The control unit 270 of the PC 200 then transmits the generated access grant request signal to the server 300.

In doing so, the user password can be encrypted using MD5 hash. And, the device information of the PC 200 can include a MAC address.

Meanwhile, the control unit 340 of the server 300 performs an access authenticating process on the user information (e.g., user ID, password and device information) within the access grant request signal received from the PC 200 via the authenticating unit 320 and then transmits a signal indicating an access grant result of the authenticating unit 320 to the PC 200 via the communication unit 310.

In doing so, the control unit 340 of the server transmits an access grant result signal, which includes the device information of the mobile terminal 100 previously set by a user of the PC 200, to the PC 200, as shown in Table 2 and Table 3.

Table 2 shows one example of the access grant result signal format including the device information of the mobile terminal 100, which is transmitted to the PC 200 by the server 300.

Table 3 shows one example of a sequence of a signal indicating a success of the access grant.

TABLE 2

| Return data | | | |
|---|---|---|---|
| Header | | Body | |
| Column | Value | Column | Value |
| result_code | 00, 99 | wallpaper_pixel_size | 240 × 320 |
|  | PASS | memo_note_size | 1000 |
|  | ID_NOT_FOUND | text_viewer_use_flag | Y |
| alert_msg | PW_NOT_MATCHED | first_name | Nicole |
|  | ACTIVATION_NOT_AVAILABLE | last_name | Kidman |
|  | INTERNAL_SERVER_ERROR | model code | K88 |
|  |  | carrier_name | Vodafone |
| elem_cnt | 9 | phone_connect_flag | Y |
|  |  | web_sync_use_flag | Y |

TABLE 3

```
..:
"header": ..:
{"result_code" : "00", "alert_msg": "PASS", "elem_cnt": "9"} ..:
..:
"body": ..:
{"wallpaper_pixel_size": "240*320", ..:
   "memo_note_size": "1000", ..:
   "text_viewer_use_flag": "Y", ..:
   "first_name": "Nicole", ..:
   "last_name": :"Kidman", ..:
   "model_code": "K88", ..:
   "carrier_name": "vodafone", ..:
   "phone_connect_flag": "Y" ..:
   "web_sync_use_flag": "Y"} ..:
..:
```

Referring to Table 2 and Table 3, the access grant result signal includes a header and a body. In particular, the header includes a parameter indicating an access grant result, a parameter indicating a detail of the access grant result, and a parameter indicating an element count of the device information of the mobile terminal 100 attached to the body. And, the body includes sub-elements of the device information of the mobile terminal 100 receiving the content data of the PC 200.

The 'result_code' is a parameter indicating an access grant result of the PC 200. If the 'result_code' is set to 00, it indicates an access success. If the 'result_code' is set to 99, it indicates an access failure.

The 'alert_msg' is a parameter indicating a detailed content of the access grant result. If the 'alert_msg' is set to 'PASS', it indicates a grant access success. If the 'alert_msg' is set to 'ID_NOT_FOUND', it indicates that the access fails because the ID inputted by the user of the PC 200 is not registered with the server 300. If the 'alert_msg' is set to 'PW_NOT_MATCHED', it indicates that the access fails because a password inputted by the user of the PC 200 does not match a password registered with the server 300. If the 'alert_msg' is set to 'ACTIVATION_NOT_AVAILABLE', it indicates that the access fails because the ID and password inputted by a user are not web-activated in the mobile terminal 100. If the 'alert_msg' is set to 'INTERNAL_SERVER_ERROR', it indicates that the access fails due to an internal error of the server 300.

Meanwhile, "wallpaper_pixel_size" indicates a resolution size of a screen supported by the mobile terminal 100, "memo_note_size" indicates a maximum note size supported by the mobile terminal 100, "text_viewer_use_flag" is an indicator indicating that a text viewer is usable in the mobile terminal 100, "first name" indicates a name of a user of the mobile terminal 100, "last name" indicates a last name of the user of the mobile terminal 100, "model_code" indicates a model type of the mobile terminal 100, "carrier_name" indicates a communication service provider of the mobile terminal 100, "phone_connect_flag" is an indicator indicating that the mobile terminal 100 is accessible, and "web_sync_use_flag" is an indicator indicating that the application is usable for the mobile terminal 100.

FIGS. 6 to 9 are diagrams of screen configurations for a driven state of an application for enabling a PC to access a server and transmit content data to the server.

Referring to FIG. 6(a), if the application is executed by a user, the control unit 270 of the PC 200 displays a login window for using the application on the screen of the display unit 260.

Referring to FIG. 6(b), if a user ID and password for the login are inputted by the user, the control unit 270 of the PC 200 generates an access grant request signal including the inputted user ID and password and the device information of the PC 200, as shown in Table 1. The control unit 270 of the PC 200 then transmits the generated access grant request signal to the server 300 via the communication unit 210.

Referring to FIG. 6(c), in case of receiving an access failure result signal is received from the server 300 in response to the access grant request signal, the control unit 270 of the PC 200 makes a request for the login process to the user again.

In particular, FIG. 6(c) shows that the access fails because the user of the PC 200 inputs the password incorrectly. Therefore, an input of a correct password is requested.

Figure 7:
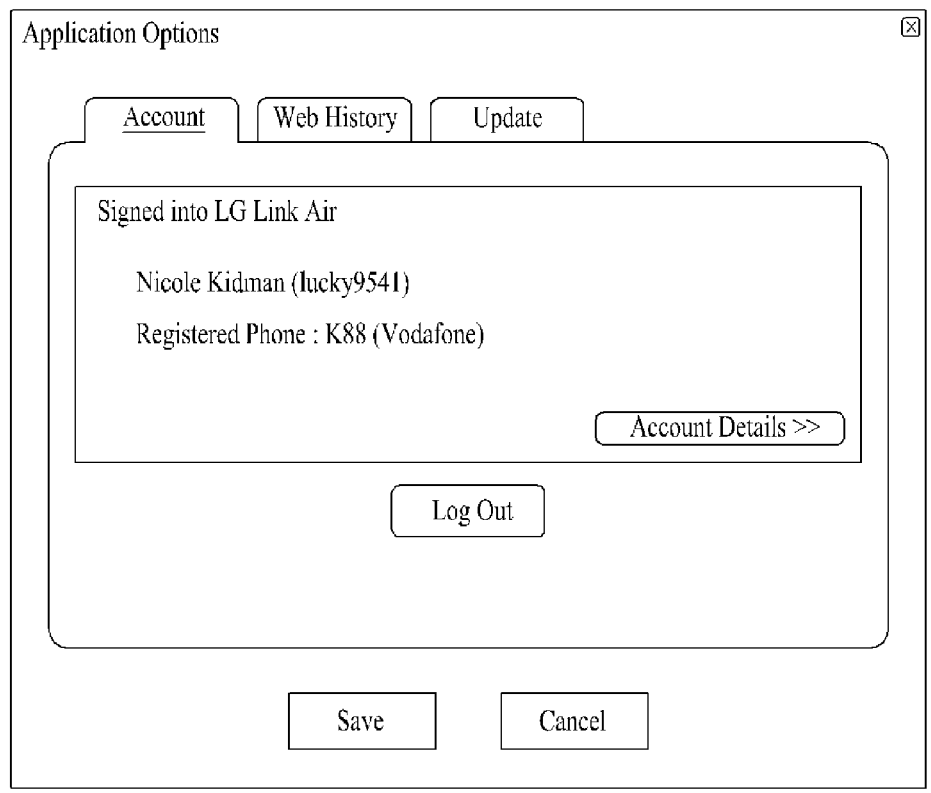

Referring to FIG. 7, the control unit 270 of the PC 200 displays an account item among application options displayed while the access to the server 300 is successful.

The account item includes information (i.e., user name and user ID) on the user of the PC 200 successfully accessing the server 300, device type information of the mobile terminal 100 to which content data of the PC 200 is transmitted via the server 300, and information on a communication service provider and the like.

And, a sub-item 'Account Details' within the account item is provided to change personal information of the user.

Figure 8:
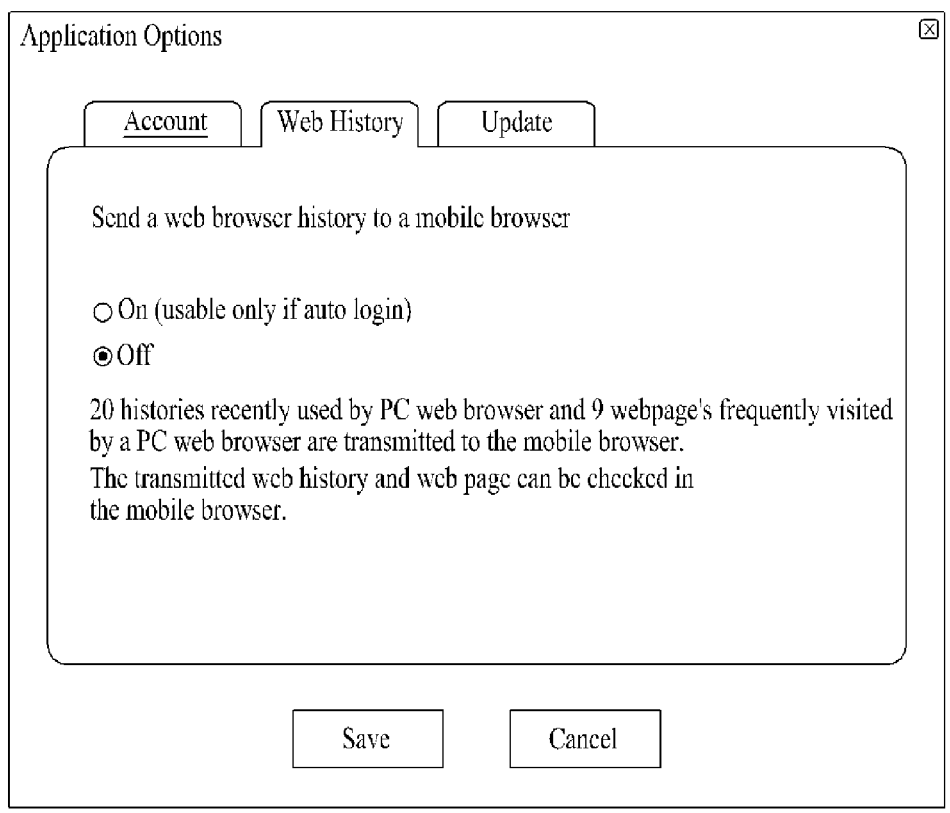

FIG. 8 shows a web history item among the application options.

Referring to FIG. 8, the web history item is a function of delivering a list of webpages accessed for a period determined by the PC 200 to the mobile terminal 100 via the server 300. If 'web history transmit on' is set within the web history item, the control unit 270 of the PC 200 obtains a list of webpages accessed by a user of the PC 200 for a determined period and then transmits the obtained webpage list to the server 300 via the communication unit 210.

FIG. shows a live update item among the application options.

Figure 9:
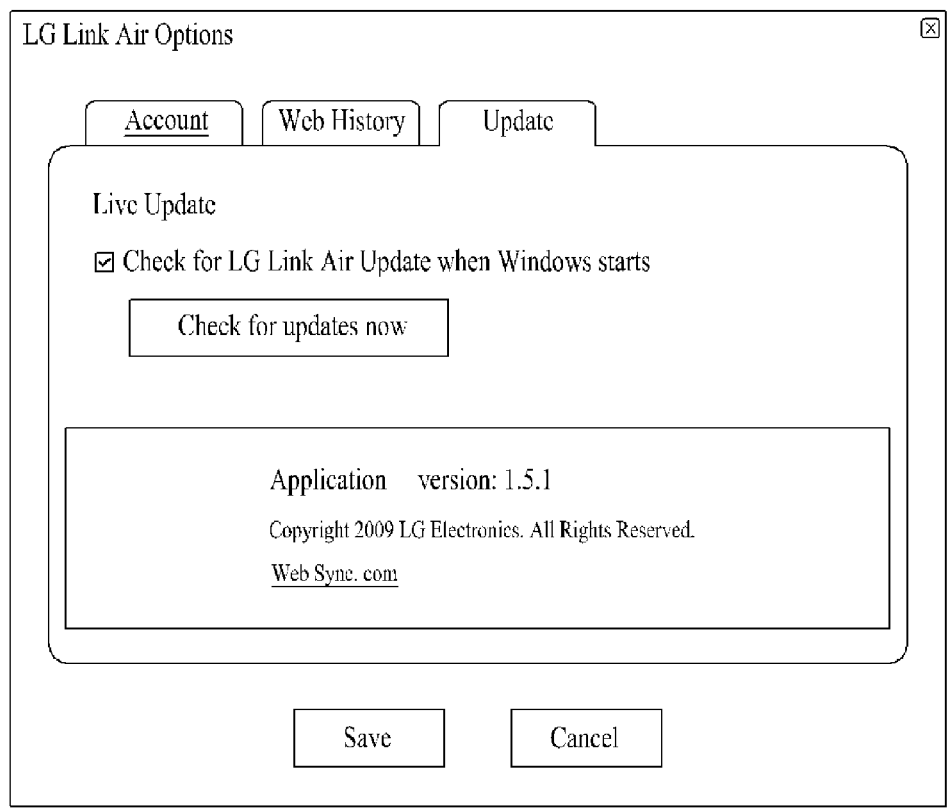

Referring to FIG. 9, the live update item includes an item for checking an update of the application in case of starting an operating system of the PC 200 and webpage address information of the server 300 providing the application.

So far, in the above description, the process for the access between the PC 200 and the server 300 and the content data transmitting process are explained in detail with reference to FIGS. 5 to 9.

In the following description, a process for transmitting the content data of the PC 200 to the server 300 using the right key of the mouse 220 is explained in detail with reference to FIGS. 10 to 19.

Figure 10:
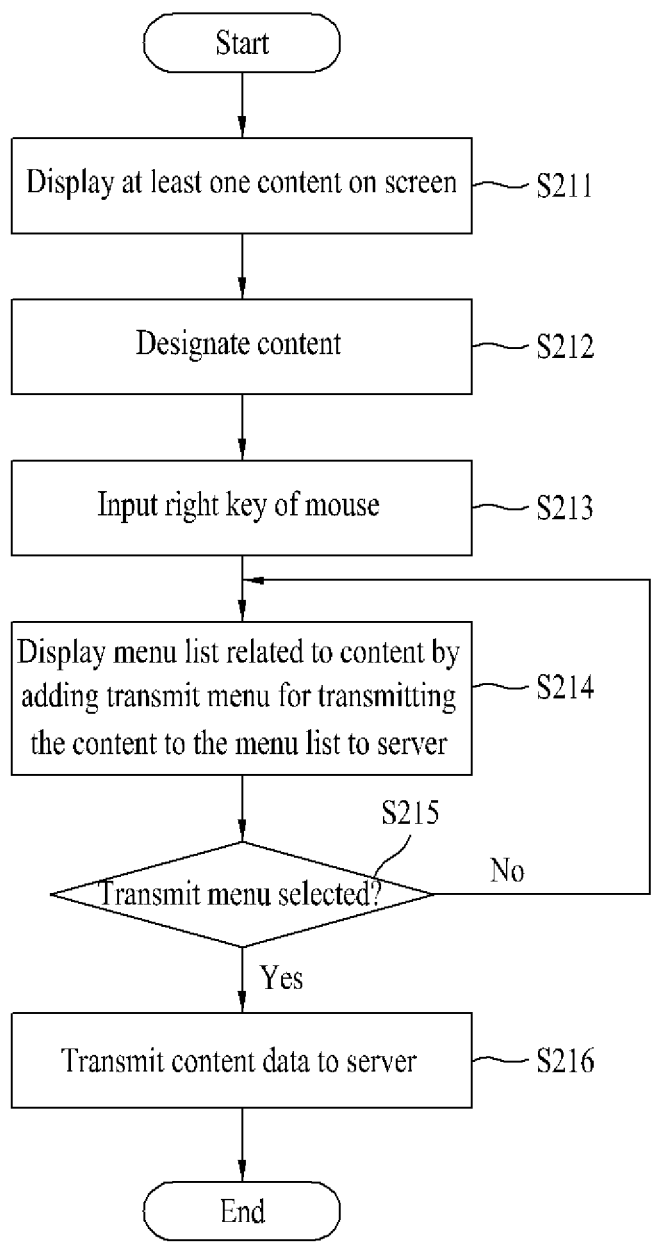
FIG. 10 is a flowchart of a process for transmitting content data in a PC according to the present invention.
Figure 11:
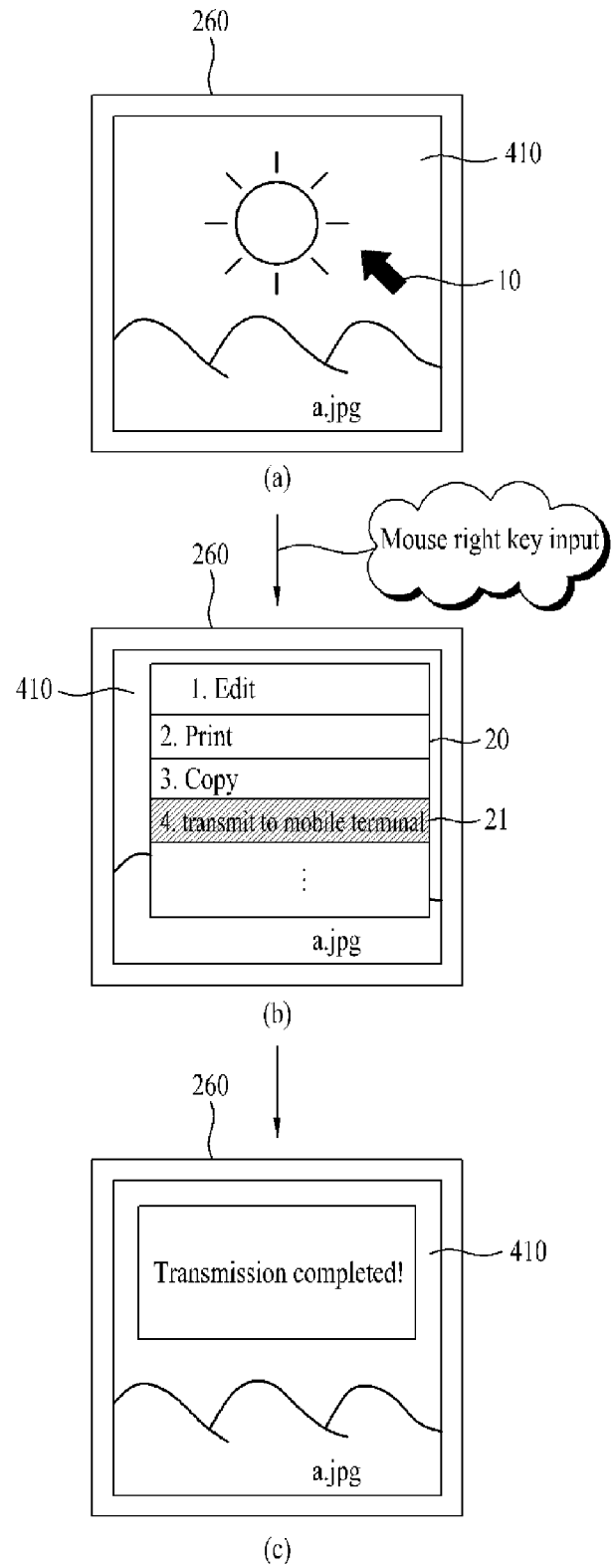
FIGS. 11 to 14 are diagrams of screen configurations for a process for transmitting an image content of a PC 200 to a server 300 according to a first embodiment of the present invention.

FIG. 10 is a flowchart of a process for transmitting content data in a PC according to the present invention.

Referring to FIG. 10, as mentioned in the foregoing description with reference to FIGS. 5 to 9, the control unit 270 of the PC 200 displays at least one content on the screen of the display unit 260 while connected to the server 300 via the application [S211].

The content on the screen is specified via the mouse 220 [S212]. While the content is specified, if the right key of the mouse 220 is inputted [S213], the control unit 270 adds a transmit menu for transmitting the content to the server 300 within a menu list related to the content and then displays the menu list having the transmit menu added thereto [S214].

In particular, after a user has placed a pointer on the screen onto the content by manipulating the mouse 220, while the user presses the left key of the mouse 220 to specify the content, if the user presses the right key of the mouse 220, the control unit 270 adds the transmit menu for transmitting the content to the server 300 within the menu list related to the content and is then able to display the menu list having the transmit menu added thereto.

Alternatively, the user is able to specify the content and enables the transmit menu added menu list to be displayed, using the right key of the mouse 220 without the left key input.

In particular, while the user places the pointer on the screen onto the content by manipulating the mouse 220, if the user presses the right key of the mouse 220, the content is specified in direct. The control unit 270 adds the transmit menu for transmitting the content to the server 300 within the menu list related to the content and is then able to display the menu list having the transmit menu added thereto. In doing so, the control unit 270 controls the transmit menu added menu list to be displayed around the content.

The rest of menus in the menu list except the transmit menu are variable according to a type of the content.

For instance, if the content is a document file, the rest of menus in the menu list except the transmit menu can include an open menu, a compress menu, a copy menu, a cut menu, a forward menu, a shortcut menu, a delete menu, a change-name menu, an attribute menu and the like.

If the content is an image file, the rest of menus in the menu list except the transmit menu can include a preview menu, an edit menu, a print menu, a link program menu, a compress menu, a copy menu, a cut menu, a forward menu, a shortcut menu, a delete menu, a change name menu, an attribute menu and the like.

If the content is an image viewer screen, the rest of menus in the menu list except the transmit menu can include an edit menu, a print menu, a clockwise rotate menu, a counterclockwise rotate menu, a zoom-in menu, a zoom-out menu, a wallpaper background pattern specify menu, a link menu, a forward menu, a shortcut menu, a delete menu, a change name menu, an attribute menu and the like.

While the transmit menu added menu list is displayed around the content, as mentioned in the above description, if the transmit menu is selected [S215], the control unit 270 transmits the selected content to the server 300 via the communication unit [S216].

In the following description, a process for transmitting the content data to the server according to a type of the content is explained in detail with reference to FIGS. 11 to 19.

First Embodiment

FIGS. 11 to 14 are diagrams of screen configurations for a process for transmitting an image content of the PC 200 to the server 300 according to a first embodiment of the present invention.

Referring to FIG. 11(a), an image content (a.jpg) 410 is displayed on the display unit 260 of the PC 200.

In this case, the screen, on which the image content (a.jpg) 410 is displayed, can include a screen on which an image provided to the memory 230 of the PC 200 is displayed. Alternatively, the screen, on which the image content (a.jpg) 410 is displayed, can include a screen on which an image within a specific webpage is displayed.

While a pointer 10 is located within the image viewer screen 410, if a user inputs the right key of the mouse 220, referring to FIG. 11(b), the control unit 270 of the PC 200 displays a menu list 20, which is related to the image content (a.jpg) and includes a transmit menu 21 of the present invention, on the image viewer screen 410.

Afterwards, if the transmit menu 21 is selected, referring to FIG. 11(c), the control unit 270 transmits data containing the image content (a.jpg) and user information (e.g., ID, password, etc.) of the PC 200 to the mobile terminal 100 via the server 300 using the communication unit 210.

Figure 12:
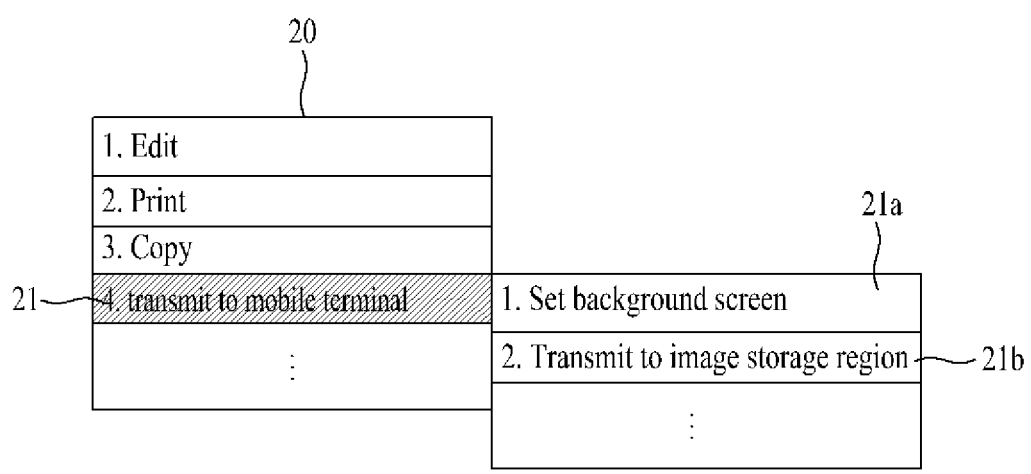
Figure 13:
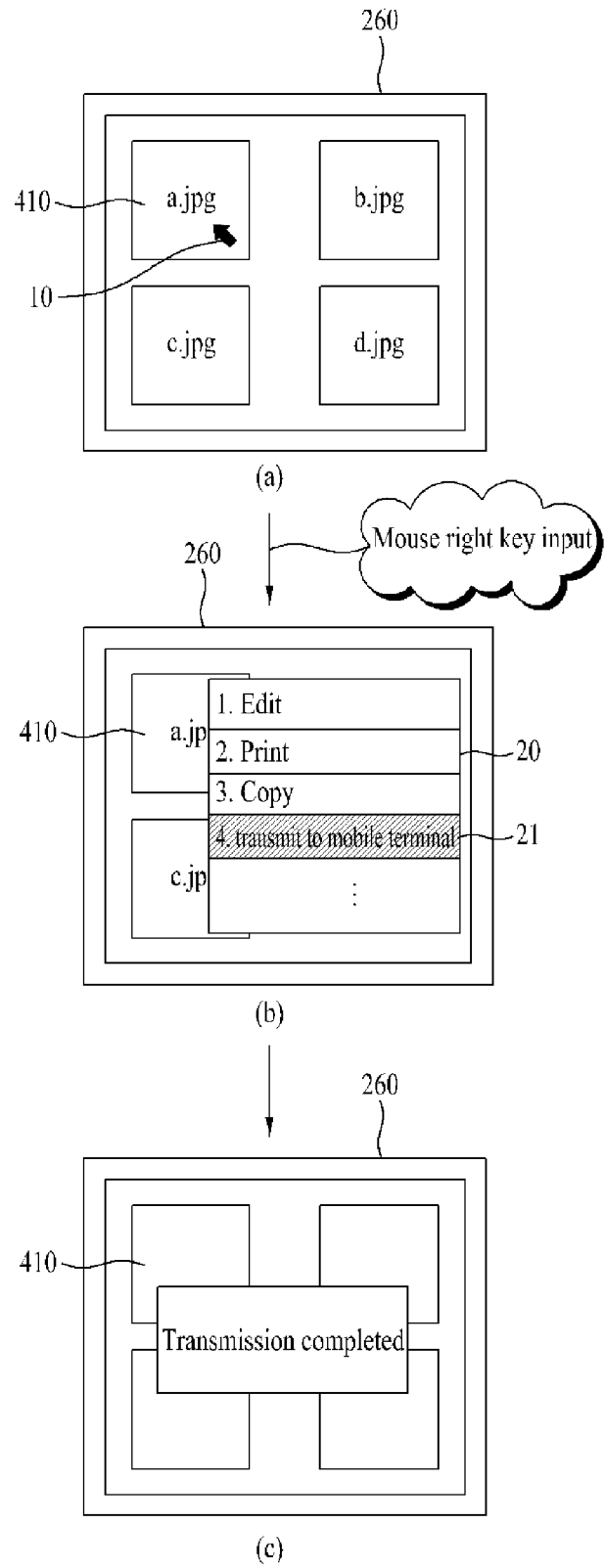
Figure 14:
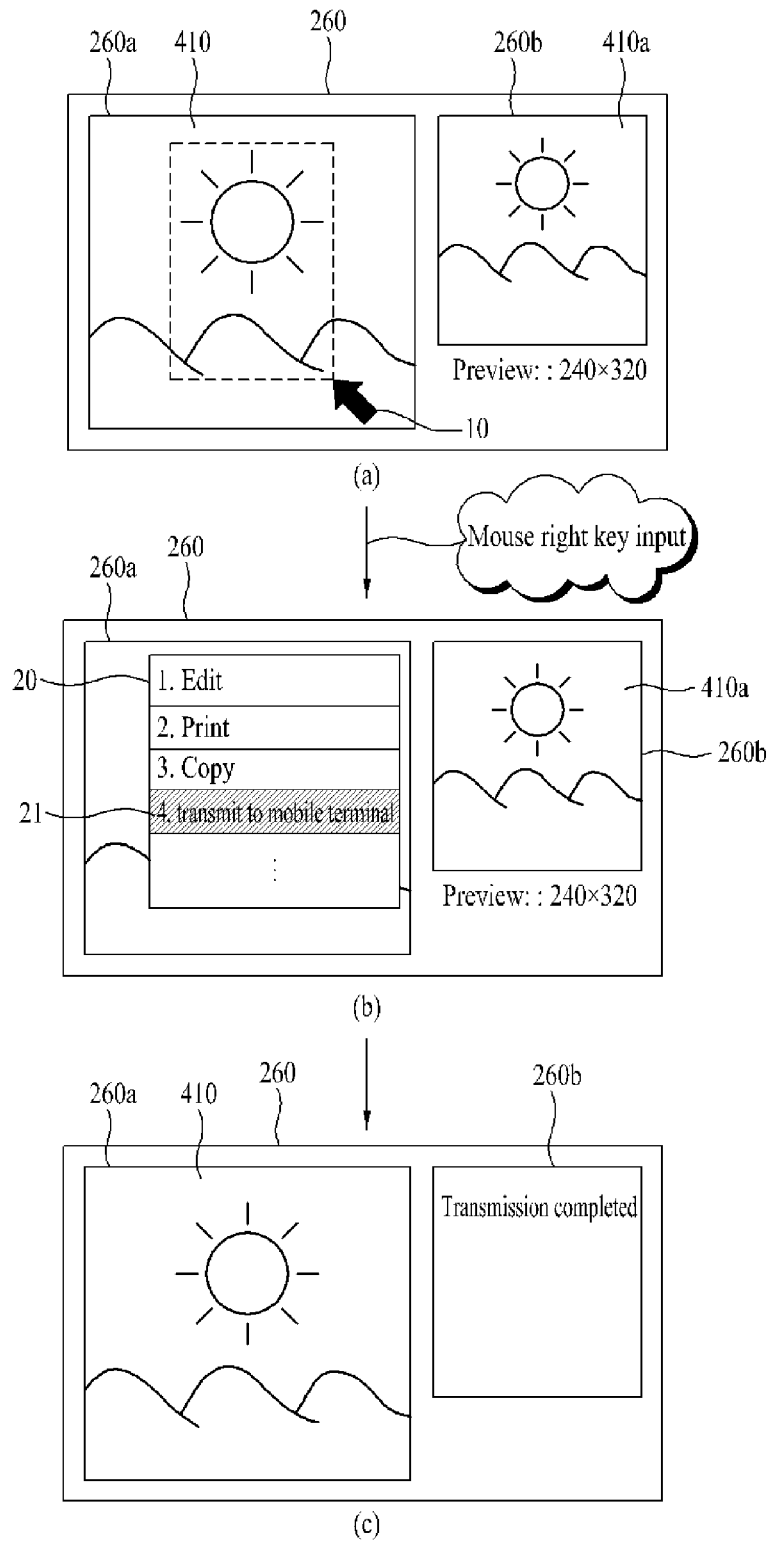

In this case, referring to FIG. 12, the transmit menu 21 can include a plurality of transmit submenus 21a and 21b.

In particular, referring to FIG. 12, if the user selects the transmit menu 21, the control unit 270 is able to additionally display a submenu list including the transmit submenus 21a and 21b subordinate to the transmit menu 21.

In this case, the first transmit submenu 21a is the menu for commanding the mobile terminal 100 to set a background screen to the image content (a.jpg).

In particular, if the user selects the first transmit submenu 21a, the controller 270 transmits the data including the image content (a.jpg) to the server 300 via the server 300. Afterwards, in case of receiving or downloading the image content (a.jpg) from the server 300, the mobile terminal 100 designates the image content (a.jpg) to the background screen.

In this case, the second transmit submenu 21b is the menu for commanding the mobile terminal 100 to store the image content (a.jpg) in an image storage region.

In particular, if the user selects the second transmit submenu 21b, the controller 270 transmits the data including the image content (a.jpg) to the server 300 via the server 300. Afterwards, in case of receiving or downloading the image content (a.jpg) from the server 300, the mobile terminal 100 enables the image content (a.jpg) to be stored in the image storage region.

Moreover, a transmit submenu for a direct display can be further included in the transmit menu 21 [not shown in FIG. 12].

In case that the mobile terminal 100 receives the image content (a.jpg), the direct display transmit submenu is the menu for commanding the mobile terminal 100 to directly display the received image content (a.jpg) on the screen.

In particular, if the user selects the direct display transmit submenu, the controller 270 transmits the data including the image content (a.jpg) to the server 300. Afterwards, in case of receiving the image content (a.jpg) from the server 300, the mobile terminal 100 directly displays the received image content (a.jpg) on its screen.

In the following description, a structure of the data having the image content (a.jpg) included therein is explained in detail with reference to Table 4.

Table 4 shows one example of a data structure in which an image content (a.jpg) transmitted to the server 300 by the PC 200 is included.

TABLE 4

| | Input Data | |
|---|---|---|
| Parameter | Parameter Name | Value |
| User ID | USER_ID | lucky9541 |
| Password | USER_PW | DF493SALD021 |
| Image | IMAGE | a.jpg |
| Data property | DATA_PROPERTY | wallpaper/photo box |

Referring to Table 4, the control unit 270 transmits the data, in which user ID and password information, the image content (a.jpg) and property of the image content (a.jpg) are included, to the server 300.

In this case, 'DATA_PROPERTY' is an indicator indicting a result of selecting the first/second transmit submenu 21a/21b and the direct display transmit submenu. If the first transmit submenu 21a is selected, the control unit 270 sets 'value' corresponding to 'DATA_PROPERTY' in Table 4 to 'wallpaper' representing a background screen.

If the second transmit submenu 21b is selected, the control unit 270 sets 'value' corresponding to 'DATA_PROPERTY' in Table 4 to 'photo box' representing an image storage region.

Meanwhile, the server 300 transmits the data, which indicates a result of receiving the data including the image content (a.jpg) from the PC 200, in the structure shown in Table 5.

TABLE 5

| Return Data | |
|---|---|
| Column | Value |
| result_code | 00, 99 |
| | PASS |
| | ID_NOT_FOUND |
| alert_msg | PW_NOT_MATCHED |
| | ACTIVATION_NOT_AVAILABLE |
| | INTERNAL_SERVER_ERROR |
| elem_cnt | 0 |

Referring to Table 5, the 'result_code' is a parameter indicating whether the data including the image content (a.jpg) transmitted by the PC 200 is normally received. If the 'result_code' is set to 00, it indicates a reception success. If the 'result_code' is set to 99, it indicates a reception failure.

The 'alert_msg' is a parameter indicating details of the reception result. If the 'alert_msg' is set to PASS, it indicates a reception success.

If the 'alert_msg' is set to 'ID_NOT_FOUND', it indicates that the user ID included in the data is not stored in the DB 330 because the user ID is not registered with the server 300 despite being received.

If the 'alert_msg' is set to 'PW_NOT_MATCHED', it indicates that the user inputted password is not stored in the dB 330 because the password inputted by the user of the PC 200 does not match a password registered with the server 300 despite being received.

If the 'alert_msg' is set to 'ACTIVATION_NOT_AVAILABLE', it indicates that the reception fails because the ID and password inputted by a user are not web-activated in the mobile terminal 100.

If the 'alert_msg' is set to 'INTERNAL_SERVER_ERROR', it indicates that the reception fails due to an internal error of the server 300.

FIG. 13(a) shows that a plurality of image contents are displayed on the display unit 260 of the PC 200.

First of all, while a pointer 10 is located on a specific image content (a.jpg) on the screen of the display unit 260 in a manner that a user manipulates the mouse 220, if the user inputs the right key of the mouse 220, referring to FIG. 13(b), the control unit 270 displays a menu list 20, which is related to the image content (a.jpg) and includes a transmit menu 21 of the present invention, on the screen of the display unit 260.

Afterwards, if the transmit menu 21 is selected, referring to FIG. 13(c), the control unit 270 transmits the data containing the image content (a.jpg) and user information (e.g., ID, password, etc.) of the PC 200 to the mobile terminal 100 via the server 300 using the communication unit 210.

Referring to FIG. 14(a), the control unit 270 of the PC 200 partitions the screen of the display unit 260 into a first region 260a and a second region 260b and then displays a viewer screen 410 of the image content (a.jpg) selected by the user on the first region 260a.

In this case, the second region 260b is provided to enable an image 410a corresponding to a region designated within the first region 260a according to user's manipulation of the mouse 220 to be displayed as a preview.

In particular, the control unit 270 partitions the screen of the display unit 260 with reference to the device information of the mobile terminal 100 received from the server 300 in a manner that the second region 260b has a size equal to an actual screen size of the mobile terminal 100.

Referring to FIG. 14(a), if a specific region is designated within the first region 260a via the mouse 220, the control unit 270 captures an image 410a corresponding to the designated region and then enables the captured image 410a to be displayed as a preview on the second region 260b.

In doing so, the control unit 270 changes a resolution of the captured image 410a into a resolution (240×320) supported by the mobile terminal 100 with reference to the device information of the mobile terminal 100 received from the server 300 and is then able to display the resolution-changed image 410a on the second region 260b.

Thus, while the specific region is designated within the first region 260a by the user, if the user inputs the right key of the mouse 220, referring to FIG. 14(b), the control unit 270 displays a menu list 20, which is related to the image content (a.jpg) and includes a transmit menu 21 of the present invention, on the first region 260a.

Afterwards, if the transmit menu 21 is selected, referring to FIG. 14(c), the control unit 270 transmits the data containing the image content (a.jpg) and user information (e.g., ID, password, etc.) of the PC 200 to the mobile terminal 100 via the server 300 using the communication unit 210.

Second Embodiment

Figure 15:
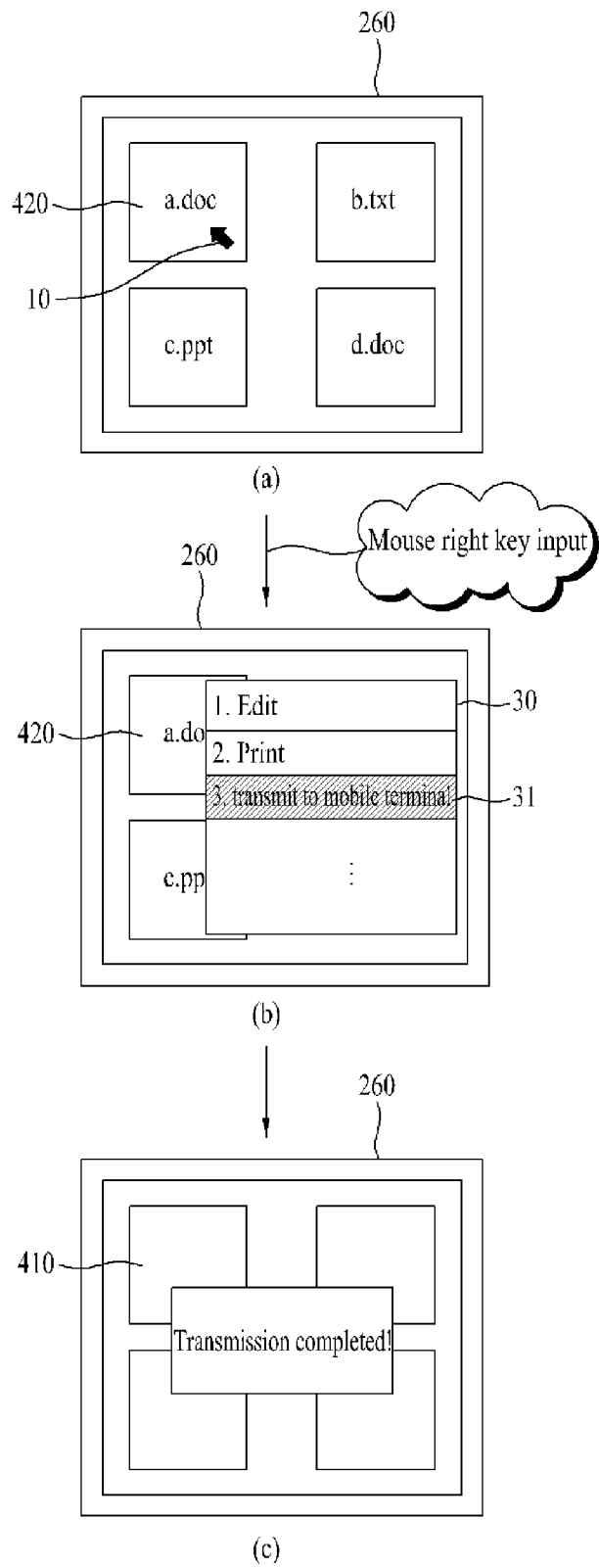
FIGS. 15 to 17 are diagrams of screen configurations for a process for transmitting a text content of a PC to a server according to a second embodiment of the present invention.
Figure 16:
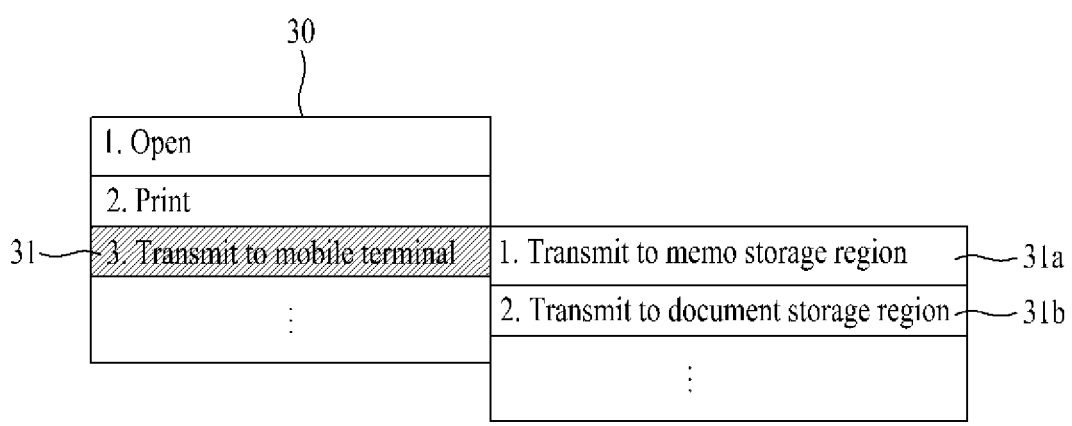
Figure 17:
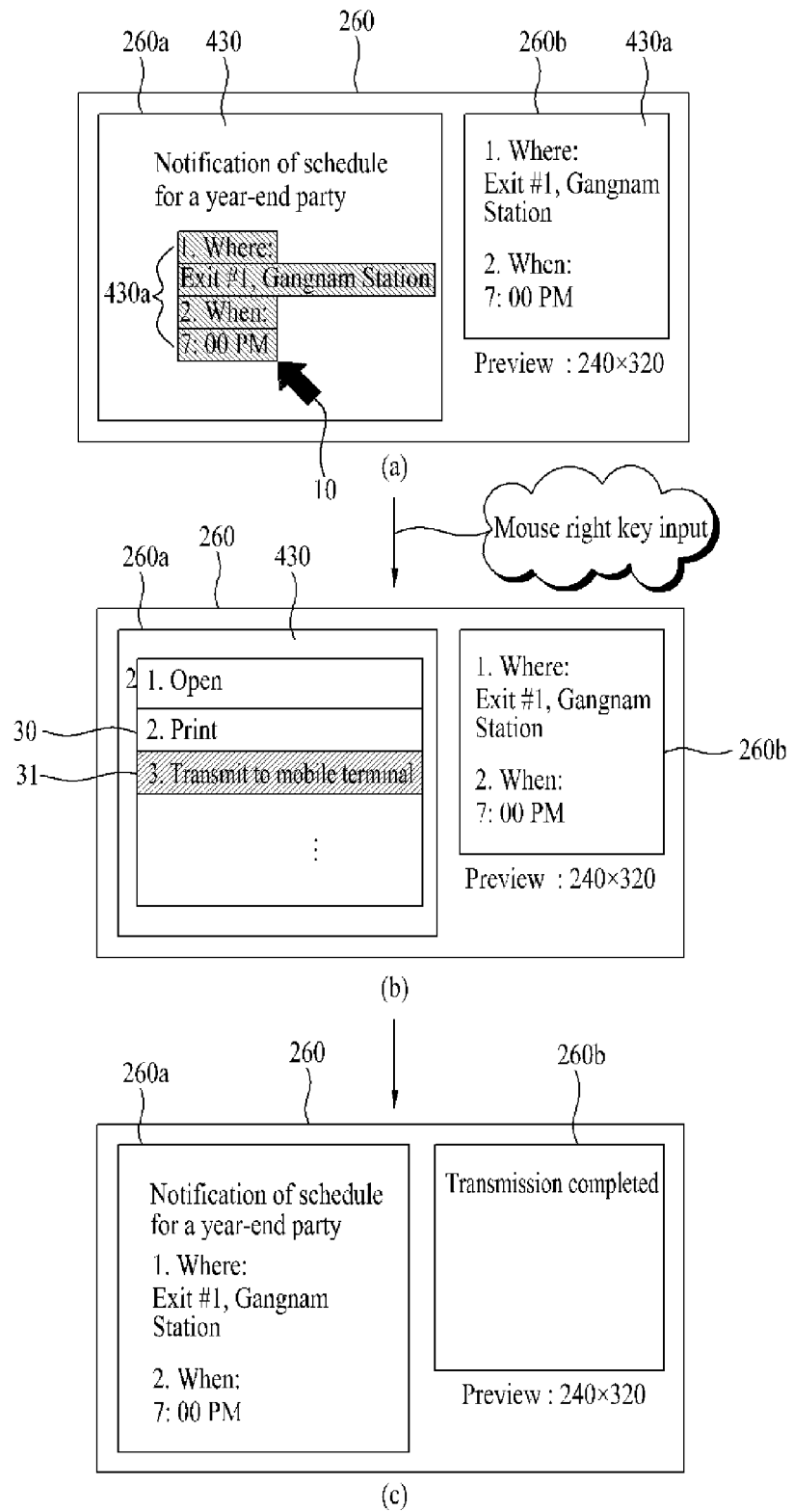

FIGS. 15 to 17 are diagrams of screen configurations for a process for transmitting a text content of a PC to a server according to a second embodiment of the present invention.

FIG. 15(a) shows that a plurality of text file contents are displayed on the display unit 260 of the PC 200.

In this case, the text file contents can include text files provided to the memory 230 of the PC 200 or text files attached to a specific webpage.

In this case, while a pointer 10 is located on a specific text content (a.doc) on the screen of the display unit 260 in a manner that a user manipulates the mouse 220, if the user inputs the right key of the mouse 220, referring to FIG. 15(b), the control unit 270 displays a menu list 20, which is related to the text content (a.doc) and includes a transmit menu 31 of the present invention, on the screen of the display unit 260.

Afterwards, if the transmit menu 31 is selected, referring to FIG. 15(c), the control unit 270 transmits the data containing the text content (a.doc) and user information (e.g., ID, password, etc.) of the PC 200 to the mobile terminal 100 via the server 300 using the communication unit 210.

In this case, referring to FIG. 16, the transmit menu 31 can include a plurality of transmit submenus 31a and 31b.

In particular, referring to FIG. 16, if the user selects the transmit menu 31, the control unit 270 is able to additionally display a submenu list including the transmit submenus 31a and 31b subordinate to the transmit menu 31.

In this case, the first transmit submenu 31a is the menu for commanding the mobile terminal 100 to enable the text content (a.doc) to be stored in the memo storage region.

In particular, if the user selects the first transmit submenu 31a, the controller 270 transmits the data including the text content (a.doc) to the server 300 via the server 300. Afterwards, in case of receiving or downloading the text content (a.doc) from the server 300, the mobile terminal 100 enables the text content (a.doc) to be stored in the memo storage region.

Moreover, the second transmit submenu 31b is the menu for commanding the mobile terminal 100 to store the text content (a.doc) in the document storage region.

In particular, if the user selects the second transmit submenu 31b, the controller 270 transmits the data including the text content (a.doc) to the server 300 via the server 300. Afterwards, in case of receiving or downloading the text content (a.doc) from the server 300, the mobile terminal 100 enables the text content (a.doc) to be stored in the document storage region.

Moreover, a transmit submenu for a direct display can be further included in the transmit menu 31 [not shown in FIG. 16].

In case that the mobile terminal 100 receives the text content (a.doc), the direct display transmit submenu is the menu for commanding the mobile terminal 100 to directly execute and display the received text content (a.doc) on the screen.

In particular, if the user selects the direct display transmit submenu, the controller 270 transmits the data including the text content (a.doc) to the server 300. Afterwards, in case of receiving the text content (a.doc) from the server 300, the mobile terminal 100 directly executes and displays the received text content (a.doc).

In the following description, a structure of the data having the text content (a.doc) included therein is explained in detail with reference to Table 6.

Table 6 shows one example of a data structure in which a text content (a.doc) transmitted to the server 300 by the PC 200 is included.

TABLE 6

| Input Data | | |
| --- | --- | --- |
| Parameter | Parameter Name | Value |
| User ID | USER_ID | lucky9541 |
| Password | USER_PW | DF493SALD021 |
| Image | TEXT | a.doc |
| Data property | DATA_PROPERTY | Memo box/document box |

Referring to Table 6, the control unit 270 transmits the data, in which user ID and password information, the text content (a.doc) and property of the text content (a.doc) are included, to the server 300.

In this case, 'DATA_PROPERTY' is an indicator indicting a result of selecting the first/second transmit submenu 31a/31b. If the first transmit submenu 31a is selected, the control unit 270 sets 'value' corresponding to 'DATA_PROPERTY' in Table 6 to 'memo document' representing a memo storage region.

If the second transmit submenu 31b is selected, the control unit 270 sets 'value' corresponding to 'DATA_PROPERTY' in Table 6 to 'document box' representing a document storage region.

Meanwhile, the server 300 transmits the data, which indicates a result of receiving the data including the text content (a.doc) from the PC 200, in the above-mentioned structure shown in Table 5.

Referring to FIG. 17(a), the control unit 270 of the PC 200 partitions the screen of the display unit 260 into a first region 260a and a second region 260b and then displays a specific text content 430 on the first region 260a.

In this case, the screen having the text content 430 displayed thereon can include the screen on which a text file provided to the memory 230 of the PC 200 is displayed or the screen on which a text included in a specific webpage is displayed.

In this case, the second region 260b is provided to enable a text 430a corresponding to a region designated within the first region 260a according to user's manipulation of the mouse 220 to be displayed as a preview.

In particular, the control unit 270 partitions the screen of the display unit 260 with reference to the device information of the mobile terminal 100 received from the server 300 in a manner that the second region 260b has a size equal to an actual screen size of the mobile terminal 100.

Referring to FIG. 17(a), if a specific region is designated within the text content 430 displayed on the first region 260a via the mouse 220, the control unit 270 recognizes the text 430a within the designated region and then enables the recognized text 430a to be displayed as a preview on the second region 260b.

Moreover, the control unit 270 captures the text 430a within the designated region and then enables the captured text 430a to be displayed as a preview on the second region 260b.

In doing so, the control unit 270 changes a resolution of the captured text 430a into a resolution (240×320) supported by the mobile terminal 100 with reference to the device information of the mobile terminal 100 received from the server 300 and is then able to display the resolution-changed image 430a on the second region 260b.

Thus, while the specific region is designated within the first region 260a by the user, if the user inputs the right key of the mouse 220, referring to FIG. 17(b), the control unit 270 displays a menu list 30, which is related to the text content 430 and includes a transmit menu 31 of the present invention, on the first region 260a.

Afterwards, if the transmit menu 31 is selected, referring to FIG. 17(c), the control unit 270 transmits the data containing the text content 430 and user information (e.g., ID, password, etc.) of the PC 200 to the mobile terminal 100 via the server 300 using the communication unit 210.

Third Embodiment

Figure 18:
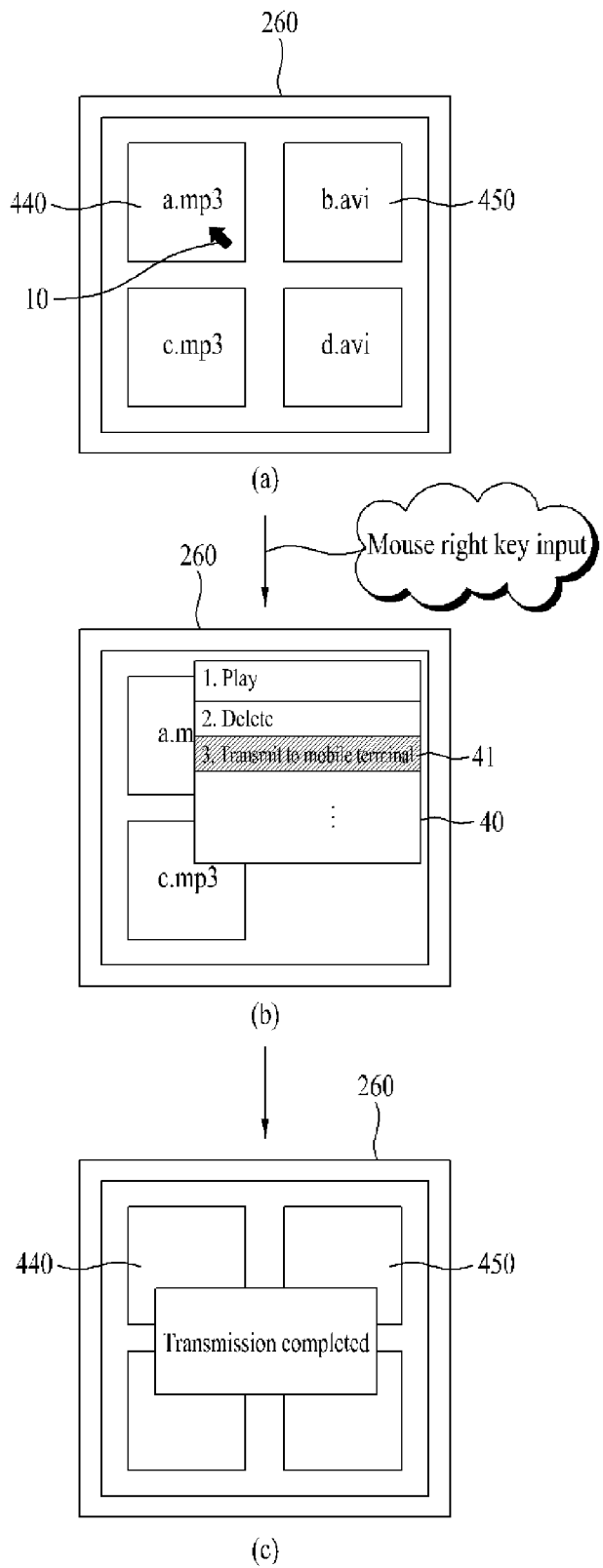
FIG. 18 is a diagrams of screen configurations for a process for transmitting an audio content of a PC to a server according to a third embodiment of the present invention.

FIG. 18 is a diagram of screen configurations for a process for transmitting an audio content of a PC to a server according to a third embodiment of the present invention.

FIG. 18(a) shows that a plurality of contents are displayed on the display unit 260 of the PC 200.

In this case, while a pointer 10 is located on a specific audio content (a.mp3) on the screen of the display unit 260 in a manner that a user manipulates the mouse 220, if the user inputs the right key of the mouse 220, referring to FIG. 18(b), the control unit 270 displays a menu list 20, which is related to the audio content (a.mp3) and includes a transmit menu 41 of the present invention, on the screen of the display unit 260.

Afterwards, if the transmit menu 41 is selected, referring to FIG. 18(c), the control unit 270 transmits the data containing the audio content (a.mp3) 440 and user information (e.g., ID, password, etc.) of the PC 200 to the mobile terminal 100 via the server 300 using the communication unit 210.

In this case, the transmit menu 41 can include a plurality of transmit submenus including first and second transmit submenus [not shown in FIG. 18].

The first transmit submenu is the menu for commanding the mobile terminal 100 to enable the audio content (a.mp3) to be stored in an audio storage region. And, the second transmit submenu is the menu for commanding the mobile terminal 100 to execute and play the audio content (a.mp3) 440 in case of receiving the audio content (a.mp3) 440.

In the following description, a structure of the data having the audio content (a.mp3) 440 included therein is explained in detail with reference to Table 7.

Table 7 shows one example of a data structure in which a audio content (a.mp3) 440 transmitted to the server 300 by the PC 200 is included.

TABLE 7

| Input Data | | |
|---|---|---|
| Parameter | Parameter Name | Value |
| User ID | USER_ID | lucky9541 |
| Password | USER_PW | DF493SALD021 |
| Image | MUSIC | a.mp3 |
| Data property | DATA_PROPERTY | music box |

Referring to Table 7, the control unit 270 transmits the data, in which user ID and password information and the audio content (a.mp3) 440 are included, to the server 300.

Meanwhile, the server 300 transmits the data, which indicates a result of receiving the data including the audio content (a.mp3) 440 from the PC 200, in the above-mentioned structure shown in Table 5.

Fourth Embodiment

Figure 19:
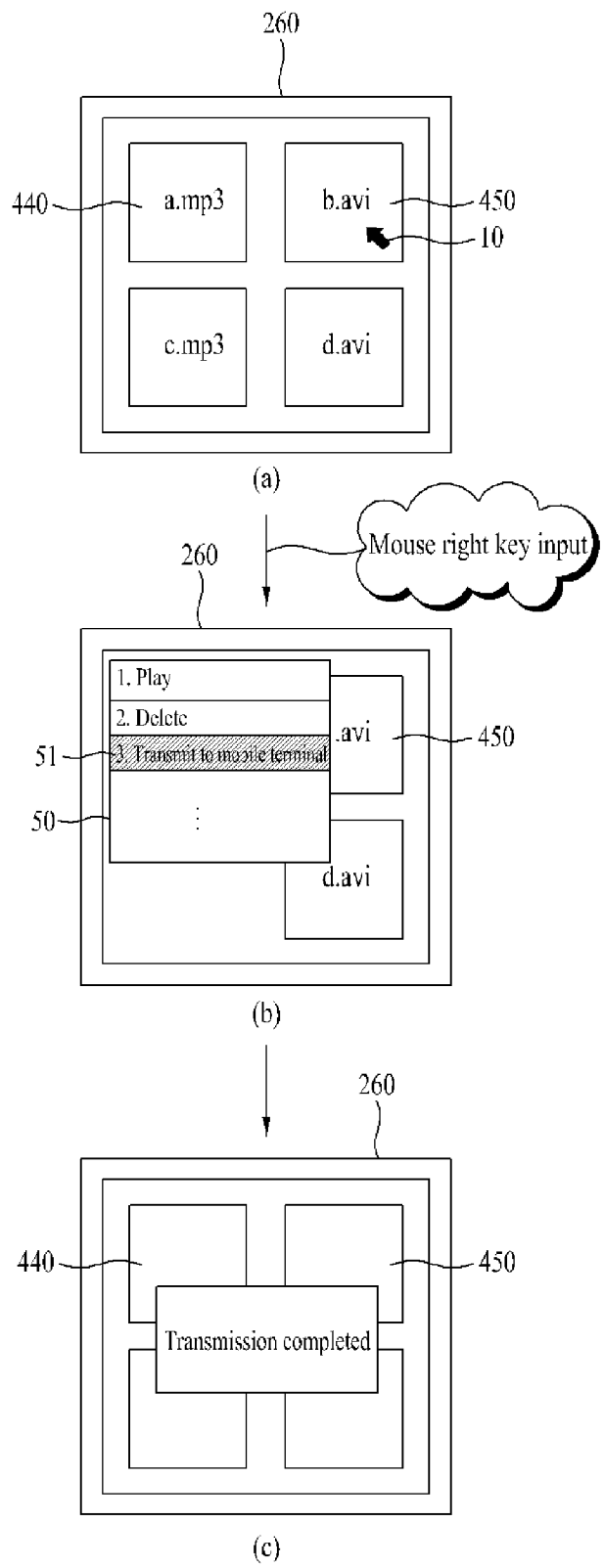
FIG. 19 is a diagrams of screen configurations for a process for transmitting a video content of a PC to a server according to a fourth embodiment of the present invention.

FIG. 19 is a diagrams of screen configurations for a process for transmitting a video content of a PC to a server according to a fourth embodiment of the present invention.

FIG. 19(*a*) shows that a plurality of contents are displayed on the display unit 260 of the PC 200.

In this case, while a pointer 10 is located on a specific video content (b.avi) 450 on the screen of the display unit 260 in a manner that a user manipulates the mouse 220, if the user inputs the right key of the mouse 220, referring to FIG. 19(*b*), the control unit 270 displays a menu list 50, which is related to the video content (b.avi) 450 and includes a transmit menu 51 of the present invention, on the screen of the display unit 260.

Afterwards, if the transmit menu 51 is selected, referring to FIG. 19(*c*), the control unit 270 transmits the data containing the video content (b.avi) 450 and user information (e.g., ID, password, etc.) of the PC 200 to the mobile terminal 100 via the server 300 using the communication unit 210.

In this case, the transmit menu 51 can include a plurality of transmit submenus including first and second transmit submenus [not shown in FIG. 19].

The first transmit submenu is the menu for commanding the mobile terminal 100 to enable the video content (b.avi) 450 to be stored in a video storage region. And, the second transmit submenu is the menu for commanding the mobile terminal 100 to execute and play the video content (b.avi) 450 in case of receiving the video content (b.avi) 450.

In the following description, a structure of the data having the video content (b.avi) 450 included therein is explained in detail with reference to Table 8.

Table 8 shows one example of a data structure in which a video content (b.avi) 450 transmitted to the server 300 by the PC 200 is included.

TABLE 8

| Input Data | | |
|---|---|---|
| Parameter | Parameter Name | Value |
| User ID | USER_ID | lucky9541 |
| Password | USER_PW | DF493SALD021 |
| Image | MOVIE | b.avi |
| Data property | DATA_PROPERTY | Movie box |

Referring to Table 8, the control unit 270 transmits the data, in which user ID and password information and the video content (b.avi) 450 are included, to the server 300.

Meanwhile, the server 300 transmits the data, which indicates a result of receiving the data including the video content (b.avi) 450 from the PC 200, in the above-mentioned structure shown in Table 5.

So far, in the above description, the process for transmitting the content data of the PC 200 to the server 300 per type of the content data.

In FIGS. 10 to 19, the types of the content transmitted from the PC 200 to the server 300 include an image type, a text type, an audio type, a video type and the like, by which the types of the content data of the present invention are non-limited.

In particular, using the contents in FIGS. 10 to 19, according to the present invention, al kinds of content data provided to the PC 200 or all content data within the webpage acceded by the PC 200 can be transmitted to the mobile terminal 100 via the server 300.

In the following description, an accessing process between the server 300 and the mobile terminal 100 and a process for transmitting data of the PC 200 to the mobile terminal 100 are explained in detail with reference to FIGS. 20 to 28.

Figure 20:
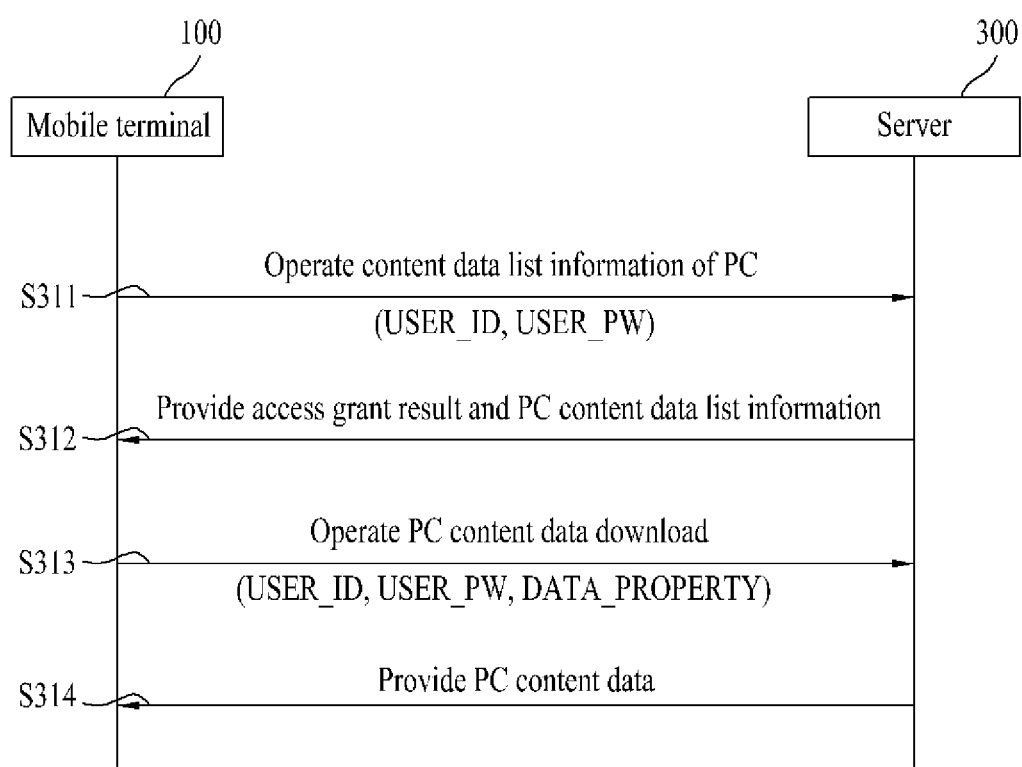
FIG. 20 is a signal processing diagram for a process of an access between a server and a mobile terminal and a process for the mobile terminal to make a request for a list of PC content data to the server according to the present invention.

FIG. 20 is a signal processing diagram for a process of an access between a server and a mobile terminal and a process for the mobile terminal to make a request for a list of PC content data to the server according to the present invention.

Referring to FIG. 20, the controller 180 of the mobile terminal 100 drives an application for an access to the server 300 and a corresponding content data transfer of the PC 200. If a user ID and password, which is the information on a user, and device information of the mobile terminal 100 are inputted via a login screen of the application, the controller 180 of the mobile terminal 100 transmits a content data list information request signal of the PC 200 including the inputted user information to the server 300 via the wireless communication unit 110 [S311]. In particular, the mobile terminal 100 makes a request for the content data list information, which is to be downloaded, of the PC 200 to the server 300.

In this case, the user information (e.g., USER_ID and USER_PW) of the mobile terminal 100 can match the former user information (e.g., USER_ID and USER_PW) of the PC 200.

In particular, in order to transmit the content data of the PC 200 to the mobile terminal 100, after a user of the mobile terminal 100 has transmitted the content data of the PC 200 to the server 300, the mobile terminal 100 of the user accesses the server 300 and then downloads the content data of the PC 200 via the server 300.

Table 9 shows one example of a content data list information request signal format containing user information transmitted to the server 300 by the mobile terminal 100.

TABLE 9

| | | Input data | |
|---|---|---|---|
| Parameter | value | value example | description |
| User ID | USER_ID | lucky9541 | User ID registered with server |
| Password | USER_PW | DF493SALD021 | User password registered with server |

Referring to Table 9, the controller 180 of the mobile terminal 100 shows the following example. First of all, the user ID inputted via the login screen of the application is 'lucky9541'. And, the password is 'DF493SALD021'.

The controller 180 generates a file download count request signal having the inputted format of 'lucky9541' & 'DF493SALD021'. The controller 180 then transmits the generated content data list information request signal to the server 300.

In doing so, the user password can be encrypted using MD5 hash.

Meanwhile, the control unit 340 of the server 300 performs an access authenticating process on the user information (e.g., user ID and USER_PW) within the content data list information request signal received from the mobile terminal 100 via the authenticating unit 320. If the authentication is successful, the control unit 340 of the server 300 searches the content data of the PC 200 stored in the DB 330 for the content data corresponding to the mobile terminal 100 and then transmits the found content data list information to the mobile terminal 100 [S312].

In doing so, the control unit 340 of the server transmits a signal, which includes the list information of the found content data, to the mobile terminal 100 in response to the PC content data list information request signal from the mobile terminal 100, as shown in Table 10.

Table 10 shows one example of the content data list information request signal format of the PC 200, which is transmitted to the mobile terminal 100 by the server 300.

TABLE 10

| Return Data | | | |
|---|---|---|---|
| Header | | Body | |
| Column | Value | Column | Value |
| result_code | 00, 99 | wallpaper | 1 |
| | PASS | photo | 1 |
| | NON_DATA | memo | 1 |
| | ID_NOT_FOUND | document | 1 |
| alert_msg | PW_NOT_MATCHED | music | 1 |
| | PHONE_DISCONNECTED | | |
| | ACTIVATION_NOT_AVAILABLE | movie | 1 |
| | INTERNAL_SERVER_ERROR | | |
| elem_cnt | 6 | | |

Referring to Table 10, a signal including a content data count of the PC 200 includes a header and a body. In particular, the header includes a parameter indicating an access grant result, a parameter indicating a detail of the access grant result, and a parameter indicating an element count of content data of the PC 200 attached to the body. And, the body includes a parameter indicating a count of the content data of the PC 200 per type of the content data.

The 'result_code' is a parameter indicating an access grant result of the mobile terminal 100. If the 'result_code' is set to 00, it indicates an access success. If the 'result_code' is set to 99, it indicates an access failure.

The 'alert_msg' is a parameter indicating a detailed content of the access grant result. If the 'alert_msg' is set to 'PASS', it indicates a grant access success. If the 'alert_msg' is set to 'NON_DATA', it indicates that the content data of the PC 200 does not exist in the DB 330 despite that the access is granted.

If the 'alert_msg' is set to 'ID_NOT_FOUND', it indicates that the access fails because the ID inputted by the user of the mobile terminal 100 is not registered with the server 300. If the 'alert_msg' is set to 'PW_NOT_MATCHED', it indicates that the access fails because a password inputted by the user of the mobile terminal 100 does not match a password registered with the server 300.

If the 'alert_msg' is set to 'PHONE_DISCONNECTED', it indicates that an application is not currently executed in the mobile terminal 100. If the 'alert_msg' is set to 'ACTIVATION_NOT_AVAILABLE', it indicates that the access fails because the ID and password inputted by a user are not web-activated in the mobile terminal 100. If the 'alert_msg' is set to 'INTERNAL_SERVER_ERROR', it indicates that the access fails due to an internal error of the server 300.

Meanwhile, the body is a field for attaching the content data list information of the PC 200. The 'wallpaper' indicates the number of images, which are received from the PC 200 by the processes shown in FIGS. 11 to 14 and are used as background screens of the mobile terminal 100, stored in the server 200. The 'photo' indicates the number of the images, which are received from the PC 200 by the processes shown in FIGS. 11 to 14, stored in the server 200.

The 'memo' indicates the number of text contents, which are received from the PC 200 by the processes shown in FIGS. 15 to 17, to be stored in a memo storage region of the mobile terminal 100. The 'document' indicates the number of text contents, which are received from the PC 200 by the processes shown in FIGS. 15 to 17, to be stored in a document storage region of the mobile terminal 100.

The 'music' indicates the number of audio contents, which are received from the PC 200 by the process shown in FIG. 18, to be stored in an audio storage region of the mobile terminal 100. And, the 'movie' indicates the number of video contents, which are received from the PC 200 by the processes shown in FIG. 19, to be stored in a video storage region of the mobile terminal 100.

Figure 21:
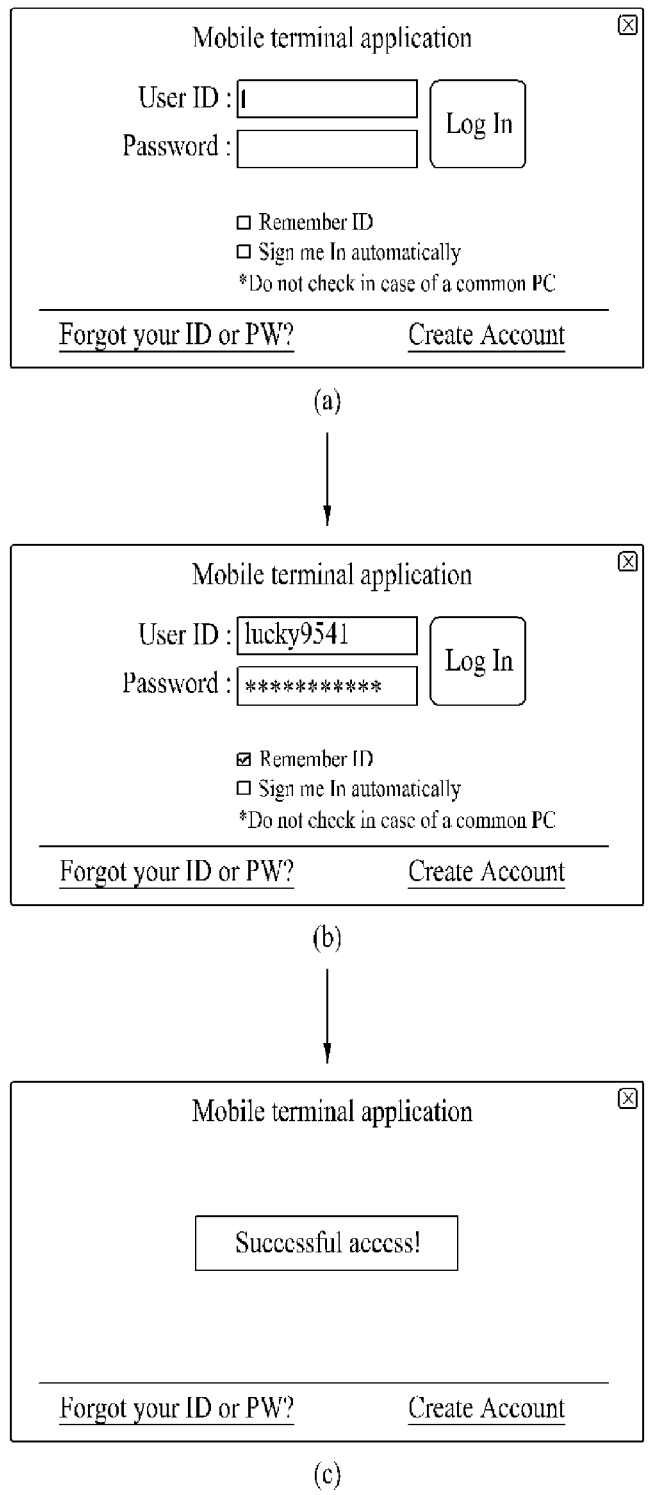
FIG. 21 is a diagram of screen configurations for a driven state of an application for enabling a mobile terminal to access a server and download content data of a PC.

FIG. 21 is a diagram of screen configurations for a driven state of an application for enabling a mobile terminal to access a server and download content data of a PC.

Referring to FIG. 21(*a*), if the application is executed by a user, the controller 180 of the mobile terminal 100 displays a login window for using the application on the screen of the display unit 151.

Referring to FIG. 21(b), if the user inputs the user information (USER_ID and USER_PW) for the login is inputted by the user, the controller 180 generates a content data list information request signal of the PC 200, which includes the inputted user information, as shown in Table 9.

The controller 180 transmits the generated content data list information request signal to the server 300 via the wireless communication unit 110.

The server 300 performs an access authenticating process on the user information within the content data list information request signal of the PC 200 received from the mobile terminal 100. If the authentication is successful, the server 300 searches the content data of the PC 200 stored in the DB 330 for the content data corresponding to the mobile terminal 100 and then transmits a signal for indicating the successful authentication result to the mobile terminal 100 in a manner that the list information of the found content data is included in the signal [cf. Table 10].

In case of receiving the successful authentication result signal from the server 300, referring to FIG. 21(c), the controller 180 of the mobile terminal 100 informs the user of the successful access via the application. The controller 180 of the mobile terminal 100 parses the PC content data list information included in the successful authentication result signal and then displays the parsed information on the display unit 151.

Figure 22:
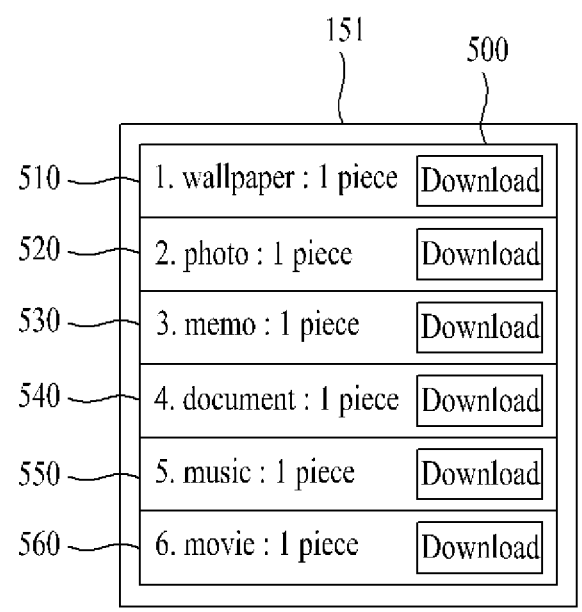
FIG. 22 is a diagram of a screen configuration of a process for a mobile terminal to receive content data list information of a PC and to download content data of the PC via the list information.

FIG. 22 is a diagram of a screen configuration of a process for a mobile terminal to receive content data list information of a PC and to download content data of the PC via the list information.

Referring to FIG. 22, in case of receiving the signal including the PC content data list information 500, as shown in Table 9, from the server 300 via the wireless communication unit 110, the controller 180 parses the PC content data list information 500 attached to a body of the signal and then displays the parsed content data list 500 on the application screen.

In doing so, a user is able to download a specific content data of the PC 200 using the content data list 500.

In particular, if at least one or more content data are selected from the content data list 500, the controller 180 generates a signal for requesting the selected content data and then transmits the generated content data download request signal to the server 300 via the wireless communication unit 110.

In this case, in the content data download request signal, the user information (USER_ID and USER_PW) and property information (DATA_PROPERTY) of the content data selected by the user are included.

The process for the controller 180 to generate the content data download request signal shall be described in detail with reference to FIGS. 23 to 28 later.

Meanwhile, if the content data download request signal is received from the mobile terminal 100, the control unit 340 of the server 300 primarily searches the content data stored in the DB 330 for the content data corresponding to the mobile terminal 100.

The control unit 340 secondarily searches the primarily searched content data for the content data having property match that of the content data included in the content data download request signal. The control unit 340 then transmits an ACK signal indicating a download grant certification of the mobile terminal for the secondarily found content data to the mobile terminal 100 [S314].

In this case, if the ACK signal is received from the server 300, the control unit 340 of the server 300 downloads the content data selected by the user.

In the following description, a process for downloading at least one or more content data in the content data list 500 is explained in detail with reference to FIGS. 23 to 28.

First of all, a process for the mobile terminal 100 to download all content data in the content data list 500 from the server 300 is explained with reference to Table 11.

Table 11 shows one example of a signal format for requesting a download of all content data in the content data list 500.

TABLE 11

| Input Data | | |
|---|---|---|
| Parameter | Parameter Name | Value |
| User ID | USER_ID | lucky9541 |
| Password | USER_PW | DF493SALD021 |
| Data property | DATA_PROPERTY | wallpaper/photo/memo/document/music/movie |

Referring to Table 11 and FIG. 22, if 'download all' is selected from an application screen having the content data list 500 displayed thereon, the controller 180 of the mobile terminal 100 generates a content data download request signal, in which a user ID, a user password and property information of all content data existing in the content data list 500 are included, as shown in Table 11.

If the request signal generated according to Table 11 is received from the mobile terminal 100, the control unit 340 of the server 300 transmits an ACK signal for approving a download rant for the content data matching the content data property information within the request signal n the DB 330 to the mobile terminal 100.

If the ACK signal is received, the controller 180 of the mobile terminal 100 downloads the content data from the server 300 via the wireless communication unit 110 and then enables each of the downloaded content data to be stored.

FIG. 23 is a diagram of screen configurations for a mobile terminal to download wallpaper content data in a content data list received from a server.

Referring to FIG. 23(a), if the 'wallpaper' 510 is selected from the content data list 500 shown in FIG. 22, the controller 180 generates a wallpaper download request signal, as shown in Table 12.

TABLE 12

| Input Data | | |
|---|---|---|
| Parameter | Parameter Name | Value |
| User ID | USER_ID | lucky9541 |
| Password | USER_PW | DF493SALD021 |
| Data property | DATA_PROPERTY | wallpaper |

The controller 180 transmits the wallpaper download request signal, which is generated as shown in Table 12, to the server 300 via the wireless communication unit 110. If the ACK signal is received from the server 300, the controller 180 downloads the wallpaper 510 from the server 300.

Referring to FIG. 23(b), if the download of the wallpaper 510 is completed, the controller 180 inquires a user whether to set a background screen of the downloaded wallpaper 510.

If the user inputs a command for setting the background screen of the downloaded wallpaper 510, referring to FIG. 23(c), the controller 180 sets the background screen of the mobile terminal 100 to the wallpaper 510.

Figure 24:
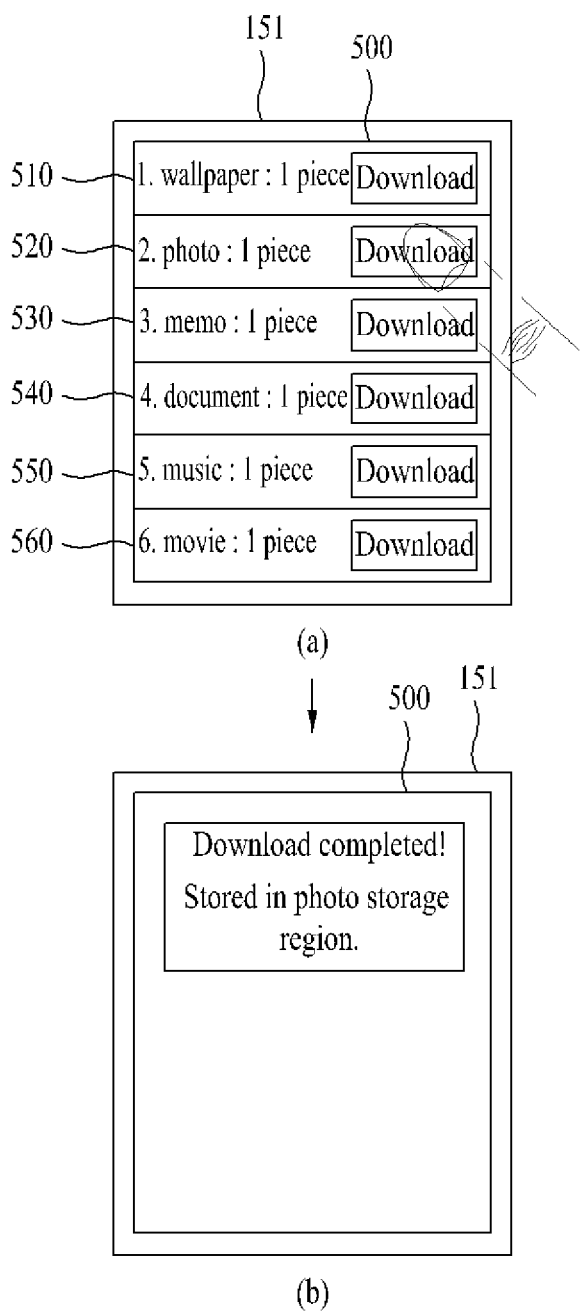
FIG. 24 is a diagram of screen configurations for a mobile terminal to download photo content data in a content data list received from a server.

FIG. 24 is a diagram of screen configurations for a mobile terminal to download photo content data in a content data list received from a server.

Referring to FIG. 24(a), if the 'photo' 520 is selected from the content data list 500 shown in FIG. 22, the controller 180 generates a photo download request signal, as shown in Table 13.

TABLE 13

| Input Data | | |
|---|---|---|
| Parameter | Parameter Name | Value |
| User ID | USER_ID | lucky9541 |
| Password | USER_PW | DF493SALD021 |
| Data property | DATA_PROPERTY | photo |

The controller 180 transmits the photo download request signal, which is generated as shown in Table 13, to the server 300 via the wireless communication unit 110. If the ACK signal is received from the server 300, the controller 180 downloads the photo 520 from the server 300.

Referring to FIG. 24(b), if the download of the photo 520 is completed, since a storage region of the photo 520 is designated to a photo storage region by the PC 200, the controller 180 enables the downloaded photo 520 to be stored in the photo storage region within the memory 160.

Figure 25:
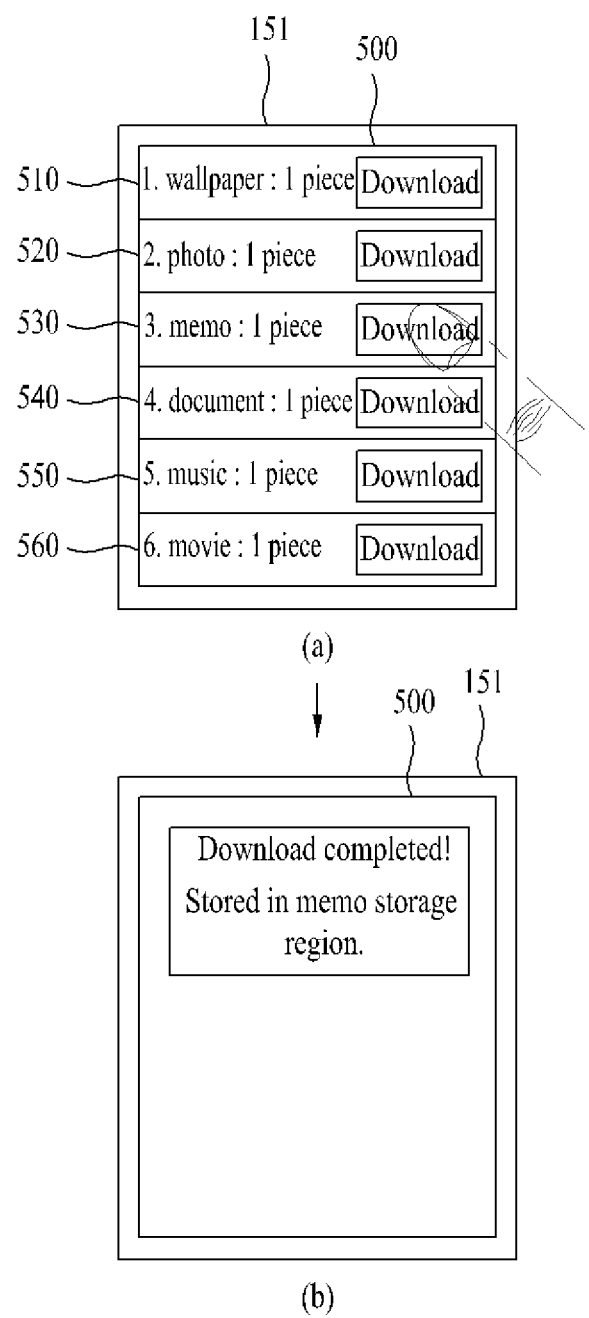
FIG. 25 is a diagram of screen configurations for a mobile terminal to download memo content data in a content data list received from a server.

FIG. 25 is a diagram of screen configurations for a mobile terminal to download memo content data in a content data list received from a server.

Referring to FIG. 25(a), if the 'memo' 530 is selected from the content data list 500 shown in FIG. 22, the controller 180 generates a memo download request signal, as shown in Table 14.

TABLE 14

| Input Data | | |
|---|---|---|
| Parameter | Parameter Name | Value |
| User ID | USER_ID | lucky9541 |
| Password | USER_PW | DF493SALD021 |
| Data property | DATA_PROPERTY | memo |

The controller 180 transmits the memo download request signal, which is generated as shown in Table 14, to the server 300 via the wireless communication unit 110. If the ACK signal is received from the server 300, the controller 180 downloads the memo 530 from the server 300.

Referring to FIG. 25(b), if the download of the memo 530 is completed, since a storage region of the memo 530 is designated to a memo storage region by the PC 200, the controller 180 enables the downloaded memo 530 to be stored in the memo storage region within the memory 160.

Figure 26:
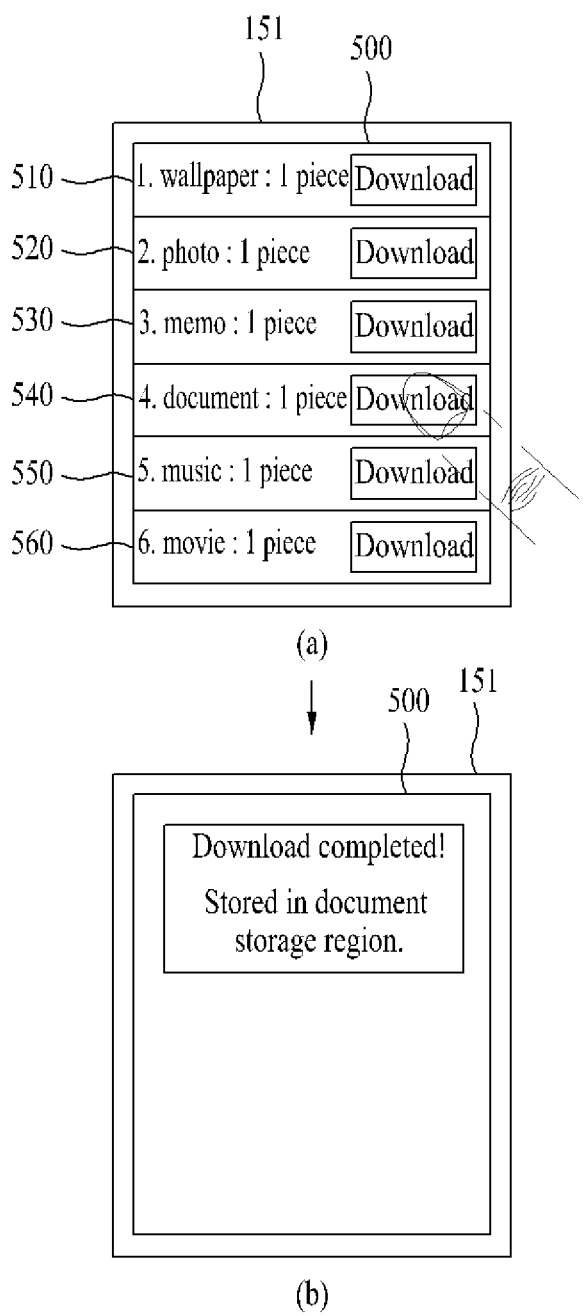
FIG. 26 is a diagram of screen configurations for a mobile terminal to download document content data in a content data list received from a server.

FIG. 26 is a diagram of screen configurations for a mobile terminal to download document content data in a content data list received from a server.

Referring to FIG. 26(a), if the 'document' 540 is selected from the content data list 500 shown in FIG. 22, the controller 180 generates a document download request signal, as shown in Table 15.

TABLE 15

| Input Data | | |
|---|---|---|
| Parameter | Parameter Name | Value |
| User ID | USER_ID | lucky9541 |
| Password | USER_PW | DF493SALD021 |
| Data property | DATA_PROPERTY | document |

The controller 180 transmits the document download request signal, which is generated as shown in Table 15, to the server 300 via the wireless communication unit 110. If the ACK signal is received from the server 300, the controller 180 downloads the document 540 from the server 300.

Referring to FIG. 26(b), if the download of the document 540 is completed, since a storage region of the document 540 is designated to a document storage region by the PC 200, the controller 180 enables the downloaded document 540 to be stored in the document storage region within the memory 160.

Figure 27:
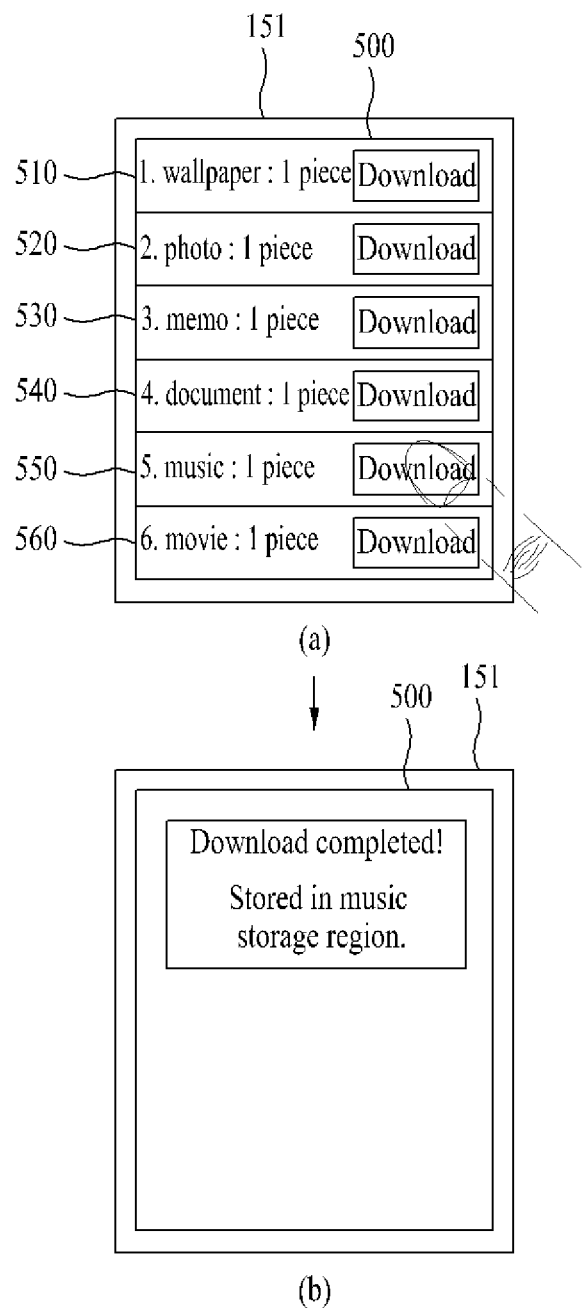
FIG. 27 is a diagram of screen configurations for a mobile terminal to download music content data in a content data list received from a server.

FIG. 27 is a diagram of screen configurations for a mobile terminal to download music content data in a content data list received from a server.

Referring to FIG. 27(a), if the 'music' 550 is selected from the content data list 500 shown in FIG. 22, the controller 180 generates a music download request signal, as shown in Table 16.

TABLE 16

| Input Data | | |
|---|---|---|
| Parameter | Parameter Name | Value |
| User ID | USER_ID | lucky9541 |
| Password | USER_PW | DF493SALD021 |
| Data property | DATA_PROPERTY | music |

The controller 180 transmits the music download request signal, which is generated as shown in Table 16, to the server 300 via the wireless communication unit 110. If the ACK signal is received from the server 300, the controller 180 downloads the music 550 from the server 300.

Referring to FIG. 27(b), if the download of the music 550 is completed, since a storage region of the music 550 is designated to a music storage region by the PC 200, the controller 180 enables the downloaded music 550 to be stored in the music storage region within the memory 160.

Figure 28:
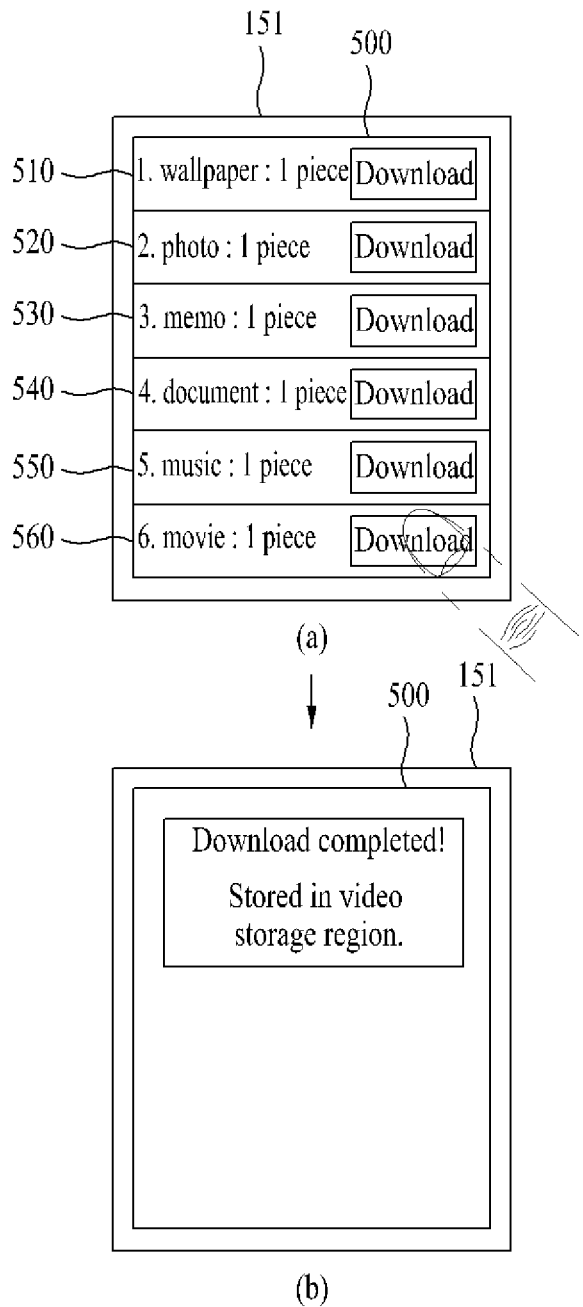
FIG. 28 is a diagram of screen configurations for a mobile terminal to download movie content data in a content data list received from a server.

FIG. 28 is a diagram of screen configurations for a mobile terminal to download movie content data in a content data list received from a server.

Referring to FIG. 28(a), if the 'movie' 560 is selected from the content data list 500 shown in FIG. 22, the controller 180 generates a movie download request signal, as shown in Table 17.

TABLE 17

| Input Data | | |
|---|---|---|
| Parameter | Parameter Name | Value |
| User ID | USER_ID | lucky9541 |
| Password | USER_PW | DF493SALD021 |
| Data property | DATA_PROPERTY | movie |

The controller 180 transmits the movie download request signal, which is generated as shown in Table 17, to the server 300 via the wireless communication unit 110. If the ACK signal is received from the server 300, the controller 180 downloads the movie 560 from the server 300.

Referring to FIG. 28(b), if the download of the movie 560 is completed, since a storage region of the movie 560 is designated to a video storage region by the PC 200, the controller 180 enables the downloaded movie 560 to be stored in the video storage region within the memory 160.

Accordingly, the present invention provides the following effects and/or advantages.

First of all, according to at least one of embodiments of the present invention, when a menu list related to a content displayed on a screen of a first terminal (e.g., PC) is displayed, a transmit menu for transmitting the content to a second terminal (e.g., mobile terminal) is additionally displayed on the menu list. If the transmit menu is selected, the content is transmitted to the second terminal. Therefore, the present invention is able to quickly transmit such an item displayed on the screen of the first terminal as an image, a document, a file, a webpage screen and the like to the second terminal.

It will be apparent to those skilled in the art that various modifications and variations can be specified into other forms without departing from the spirit or scope of the inventions.

In addition the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a display unit configured to display content on a screen;
a wireless communication unit configured to communicate with at least one external terminal, and to receive device information of the external terminal; and
a control unit configured to:
partition the screen into a first region and a second region based on the received device information, the second region having a size equal to an actual screen size of the at least one external terminal based on the received device information;
display the content on the first and second regions;
display, on the first region, a menu list including a transmission menu of the content when a command for displaying the menu list related to the content is input; and
control the communication unit to transmit the content to the external terminal when the transmission menu is selected.

2. The mobile terminal of claim 1, wherein the communication unit further performs communication with a server connected to the external terminal, and
wherein the control unit transmits the content to the external terminal via the server.

3. The mobile terminal of claim 1, wherein the content is an image file, and
wherein the control unit changes a resolution of the image file into a resolution supported by the external terminal when the transmission menu is selected, and transmits the resolution changed image file.

4. The mobile terminal of claim 1, wherein the content is an image viewer screen, and
wherein while a designated region within the image viewer screen is selected and the transmission menu is selected, the control unit changes a resolution of the designated region into a resolution supported by the external terminal and then transmits an image file corresponding to the designated region.

5. The mobile terminal of claim 1, wherein the content is a document viewer screen, and
wherein while a designated region within the document viewer screen is selected and the transmission menu is selected, the control unit extracts a text within the designated region and transmits a file of the extracted text.

6. The mobile terminal of claim 5, wherein the control unit transmits the file of the extracted text to be directly stored in a memo storage region or a document storage region of the external terminal.

7. The mobile terminal of claim 1, wherein the content is a web browser screen, and
wherein when a designated file attached to the web browser screen is selected and the transmission menu is selected, the control unit transmits the designated file.

8. The mobile terminal of claim 1, wherein the content is a web browser screen, and
wherein when a designated file is selected within the web browser screen and the transmission menu is selected, the control unit extracts at least one of an image and a text within the designated region and then transmits the extracted image or text.

9. The mobile terminal of claim 1, wherein the content is a webpage address list of a plurality of webpage's accessed by the terminal for a predetermined period, and
wherein if the transmission menu is selected, the control unit transmits the webpage address list.

10. The mobile terminal of claim 1, wherein when a specific region is designated within the first region, the controller captures an image corresponding to the specific region and displays the captured image as a preview on the second region.

11. A method of controlling a mobile terminal, the method comprising:
displaying, via a display unit of the mobile terminal, at least one content on a screen;
receiving, via a wireless communication unit of the mobile terminal, device information of at least one external terminal;
partitioning the screen into a first region and a second region based on the received device information, the second region having a size equal to an actual screen size of the at least one external terminal based on the received device information;
displaying the content on the first and second regions;
displaying, on the first region, a menu list including a transmission menu of the content when a command for displaying the menu list related to the content is inputted; and
transmitting, via the wireless communication unit, the content to the one external terminal when the transmission menu is selected.

12. The method of claim 11, further comprising:
communicating with a server connected to the external terminal; and
transmitting the content to the external terminal via the server.

13. The method of claim 11, wherein the content is an image file, and further comprising:
- changing a resolution of the image file into a resolution supported by the external terminal when the transmission menu is selected; and
- transmitting the resolution changed image file.

14. The method of claim 11, wherein the content is an image viewer screen, and further comprising:
- selecting designated region within the image viewer screen and the transmission menu;
- changing a resolution of the designated region into a resolution supported by the external terminal; and
- transmitting an image file corresponding to the designated region.

15. The method of claim 11, wherein the content is a document viewer screen, and further comprising:
- selecting a designated region within the document viewer screen and the transmission menu;
- extracting a text within the designated region; and
- transmitting a file of the extracted text.

16. The method of claim 15, further comprising:
- transmitting the file of the extracted text to be directly stored in a memo storage region or a document storage region of the external terminal.

17. The method of claim 11, wherein the content is a web browser screen, and further comprising:
- selecting a designated file attached to the web browser screen and the transmission menu; and
- transmitting the designated file.

18. The method of claim 11, wherein the content is a web browser screen, and further comprising:
- selecting a designated file within the web browser screen and the transmission menu;
- extracting at least one of an image and a text within the designated region; and
- transmitting the extracted image or text.

19. The method of claim 11, wherein the content is a webpage address list of a plurality of webpage's accessed by the terminal for a predetermined period, and further comprising:
- selecting the transmission menu; and
- transmitting the webpage address list.

20. The method of claim 11, further comprising:
- when a specific region is designated within the first region, capturing an image corresponding to the specific region; and
- displaying the captured image as a preview on the second region.

* * * * *